United States Patent
Hattori et al.

(10) Patent No.: US 8,561,115 B2
(45) Date of Patent: Oct. 15, 2013

(54) VIDEO SERVER AND VIDEO DISTRIBUTION SYSTEM USING THE SAME

(75) Inventors: Takehiro Hattori, Osaka (JP); Kouichi Matsumura, Osaka (JP); Ken Suzuki, Osaka (JP); Shinya Teshima, Osaka (JP)

(73) Assignee: Panasonic Corporation, Osaka (JP)

( * ) Notice: Subject to any disclaimer, the term of this patent is extended or adjusted under 35 U.S.C. 154(b) by 1226 days.

(21) Appl. No.: 11/719,263

(22) PCT Filed: Oct. 27, 2005

(86) PCT No.: PCT/JP2005/019747
§ 371 (c)(1), (2), (4) Date: May 14, 2007

(87) PCT Pub. No.: WO2006/054433
PCT Pub. Date: May 26, 2006

(65) Prior Publication Data
US 2009/0083810 A1  Mar. 26, 2009

(30) Foreign Application Priority Data
Nov. 19, 2004  (JP) .................................. 2004-335644

(51) Int. Cl.
*H04N 7/173* (2011.01)

(52) U.S. Cl.
USPC ............. 725/91; 725/114; 725/131; 725/138; 725/139; 725/144; 725/151

(58) Field of Classification Search
USPC ......... 725/91–93, 95, 96, 114–116, 131, 138, 725/139, 144–145, 151
See application file for complete search history.

(56) References Cited

U.S. PATENT DOCUMENTS

| | | | | |
|---|---|---|---|---|
| 5,818,439 A * | 10/1998 | Nagasaka et al. | ............... | 725/87 |
| 5,940,738 A * | 8/1999 | Rao | ............... | 725/103 |
| 5,945,987 A | 8/1999 | Dunn | | |
| 6,314,568 B1 * | 11/2001 | Ochiai et al. | .................... | 725/34 |
| 6,453,471 B1 * | 9/2002 | Klosterman | .................... | 725/41 |
| 6,543,053 B1 * | 4/2003 | Li et al. | ........................... | 725/88 |
| 6,757,482 B1 * | 6/2004 | Ochiai et al. | .................... | 386/83 |
| 7,277,859 B2 * | 10/2007 | Watanabe et al. | ............. | 704/278 |

(Continued)

FOREIGN PATENT DOCUMENTS

| | | |
|---|---|---|
| CN | 1339920 A | 3/2002 |
| CN | 1430159 A | 7/2003 |

(Continued)

OTHER PUBLICATIONS

Chan, Kwun-chnug et al., "Performance analysis on distributed interactive server in a large-scale fully interactive VOD system (DINA)," Proc. of 15th Int. Conf. on Information Networking, Jan. 31, 2001, pp. 668-673.

(Continued)

*Primary Examiner* — Farzana Hossain
(74) *Attorney, Agent, or Firm* — Pearne & Gordon LLP

(57) ABSTRACT

There is provided a stream transmitter for generating and transmitting a digest stream that is a single stream into which digests, each having a predetermined time length, cut out from the respective plurality of video contents stored in a contents storage are combined. This configuration allows a user to view the digest stream, which collects the digests of the respective contents, and select a desirable program by viewing each digest.

20 Claims, 20 Drawing Sheets

(56) References Cited

U.S. PATENT DOCUMENTS

| | | | |
|---|---|---|---|
| 2002/0114331 A1 | 8/2002 | Cheung et al. | |
| 2003/0126603 A1 | 7/2003 | Kim et al. | |
| 2003/0154486 A1* | 8/2003 | Dunn et al. | 725/91 |
| 2004/0172654 A1* | 9/2004 | Pei et al. | 725/96 |
| 2005/0108758 A1* | 5/2005 | Jun | 725/50 |
| 2006/0242673 A1* | 10/2006 | Kondo et al. | 725/89 |

FOREIGN PATENT DOCUMENTS

| | | |
|---|---|---|
| CN | 1528088 A | 9/2004 |
| JP | 2001-258005 | 9/2001 |
| JP | 2001-320686 | 11/2001 |
| JP | 2003-289486 | 10/2003 |
| JP | 2004-104416 | 4/2004 |
| WO | 02/49359 | 6/2002 |

OTHER PUBLICATIONS

Ouchi, Sato et al., "Content-channel switching method in IP multicasting," The Institute of Electronics, Information and Communication Engineers Gijutsu Kenkyu Hokoku, Feb. 5, 2004, vol. 103, No. 650, pp. 43-48.

International Search Report (PCT/JP2005/019747) dated Feb. 21, 2006.

Chinese Office Action.

Chinese Office Action; issue/mail date Feb. 12, 2010.

European Search Report for PCT/JP2005/019747 dated Oct. 7, 2011.

Wanjiun Liao, et al., "The split and merge (SAM) protocol for interactive video-on-demand systems", Infocom '97. Sixteenth Annual Joint Conference of the IEEE Computer and Communications Societies. Driving the Information Revolution. Proceedings IEEE Kobe, Japan, Apr. 7-11, 1997, Los Alamitos, CA, IEEE Comput Soc., US vol. 3, Apr. 7, 1997, pp. 1349-1356.

Xylomenos, G, et al., "IP multicasting for point-to-point local distribution", Infocom '97. Sixteenth Annual Joint Conference of the IEEE Computer and Communications Societies. Driving the Information Revolution. Proceedings IEEE Kobe, Japan, Apr. 7-11, 1997, Los Alamitos, CA, IEEE Comput Soc., US vol. 3, Apr. 7, 1997, pp. 1380-1387.

* cited by examiner

VIDEO SERVER AND VIDEO DISTRIBUTION SYSTEM USING THE SAME

This application is a U.S. National Phase Application of PCT/JP05/19747, filed 10/27/2005, which claims foreign priority to 2004-335644, filed Nov. 19, 2004.

TECHNICAL FIELD

The present invention relates to a video delivery system for delivering video contents stored in a server in response to a request from a user.

BACKGROUND ART

It has now been a common practice for television (TV) viewers to receive video contents at their tuners via digital broadcasting, such as, terrestrial, satellite or cable TV broadcasting and to record and store the contents in their DVD (Digital Versatile Disks)-RAMs (Random Access Memories) HDDs (Hard Disk Drives) or the like at home.

With an increase in storage capacity of DVD-RAM media and HDD recorders, the contents stored in these storages have been increased in volume. This causes users to hardly search large number of contents stored in these storage media for their desired ones.

Part of the video contents stored in a storage can be read out as images and displayed as thumbnails to allow the user to easily search the contents. There is, for example, known a technique that displays as thumbnails a plurality of images contained in a video content stored in an HDD, memorizes positions of the thumbnails in the video content, and sequentially plays back a predetermined time length of image data from each thumbnail position in response to a user request for replaying a digest file. This technique is disclosed in Unexamined Japanese Patent Publication No. 2003-289486.

However, the conventional technique, which allows a user to select a video content by viewing thumbnail images, has a certain limit on facilitating the user selection of a content. Only cutting out one scene from the video content as a still image to thumbnail the same is not sufficient to precisely convey the program feature of the video content to the user.

A user who views a thumbnailed image cut out from VTR (Video Tape Recorder) images shot on location broadcasted within a variety program may mistakenly find the program as a travel one. Further, a user who views a thumbnailed CM (Commercial Message) program cut out from a program cannot find what the program actually is.

To begin with, thumbnailing only one scene of a video content hardly conveys the precise mood of the program to the user. The user may mistakenly select a video content different in mood from what the user intended to view with the thumbnailed image as a guide.

The issue that users hardly or mistakenly select video contents has increased a burden onto the users with an increase in the storage capacities. This issue is also critical in a VOD (Video-On-Demand) system, which delivers a large volume of contents stored at a TV station in response to requests from users.

SUMMARY OF THE INVENTION

To solve the above-stated problems, a video server according to the present invention comprises: a contents storage for storing a plurality of video contents; and a stream transmitter for generating and transmitting a digest stream that is a single stream into which digests, each having a predetermined time length, cut out from the respective plurality of video contents stored in the contents storage are combined.

This configuration allows a user to view a digest stream compiled only from respective parts of the plurality of the contents stored in the storage, and therefore, allows the user to select a video content to suit his/her taste appropriately unlike in selecting the content only by viewing still images. Further, the conventional thumbnailed images for selection, have required the user to press an arrow button on a remote control for example to select his/her desired program. The present invention, however, allows a viewer to select the desired program passively merely by selecting the digest stream without any active selection operation.

A video delivery system according to the present invention comprises a video server including: a contents storage for storing a plurality of video contents; a transmission stream manager for instructing a transmission of a digest stream to a stream transmitter on receiving a request for a digest stream from a client machine; and a stream transmitter for generating the digest stream on receiving the instruction from the transmission stream manager and transmits the same to the client machine, and the client machine including: a stream receiver for receiving the digest stream from the video server; a decoder for decoding and outputting the received digest stream; and a received stream manager for sending a request for transmission of a digest stream to the transmission stream manager of the video server on receiving a request for a digest stream from a user.

In this configuration, the video server generates and transmits the digest stream in response to a request from a user, and therefore, only has to generate the digest stream when necessary. This configuration can reduce a load on the video server and also reduce the bandwidth load on a communication line connected to the video server.

Figure 1:
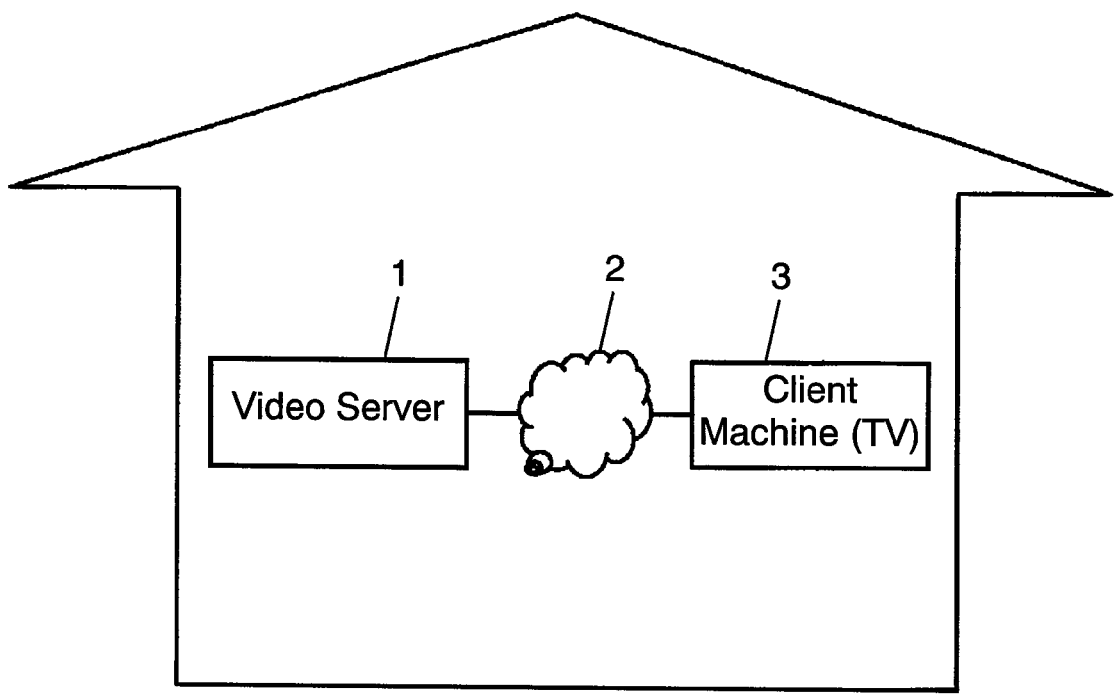
FIG. 1 is a diagram schematically showing a video delivery system according to a first preferred embodiment of the present invention.

REFERENCE MARKS IN THE DRAWINGS 1 video server
2 network
3, 81, 91 client machine
12 transmission stream manager
13 contents list
14 contents list storage
15 digests storage
16 contents storage
17 stream transmitter
31 received stream manager
32 stream receiver
33 decoder
34 digest information recorder
41, 61 client machine A
42, 62 client machine B
51 receiver numbers recorder
71 stream list storage
72 stream list
82 HDD (storage)
92 first buffer
93 second buffer
100 pausing period

DETAILED DESCRIPTION OF PREFERRED EMBODIMENTS

First Preferred Embodiment

A first preferred embodiment will be described on the assumption as a model case that: a single client machine and a single video server are connected to a home network; a user of the client machine sends a request for a digest stream to the video server; the video server generates the digest stream and transmits the same to the client machine; the user presses a "decision" button on the client machine on finding out a program that looks enjoyable while viewing the digest stream; and a body of the program starts to be received.

The first preferred embodiment will be described on the further assumption that the video server transmits the digest stream by unicast (UDP), because the video server and the client machine are in a one-to-one relationship. Multicast and broadcast transmissions are, however, also applicable.

FIG. 1 is a diagram schematically showing a video delivery system utilizing the video server and the client machine according to the present invention.

In FIG. 1, video server 1 delivers contents stored therein to client machine 3 via network 2. Video server 1 is exemplified by a DVD or HDD recorder, whereas video server 1 may, without being restricted to the example, be any storage device capable of storing and supplying video contents in response to a user request. Client machine 3 is exemplified by a television set (TV) or a personal computer (PC), whereas it may, without being restricted to the examples, be any device having a function of receiving video contents delivered by video server 1.

In FIG. 1, for example, video server 1 is placed in a family room, client machine 3 (TV) is placed in a bedroom, and they are connected to wired or wireless network 2.

Figure 2:
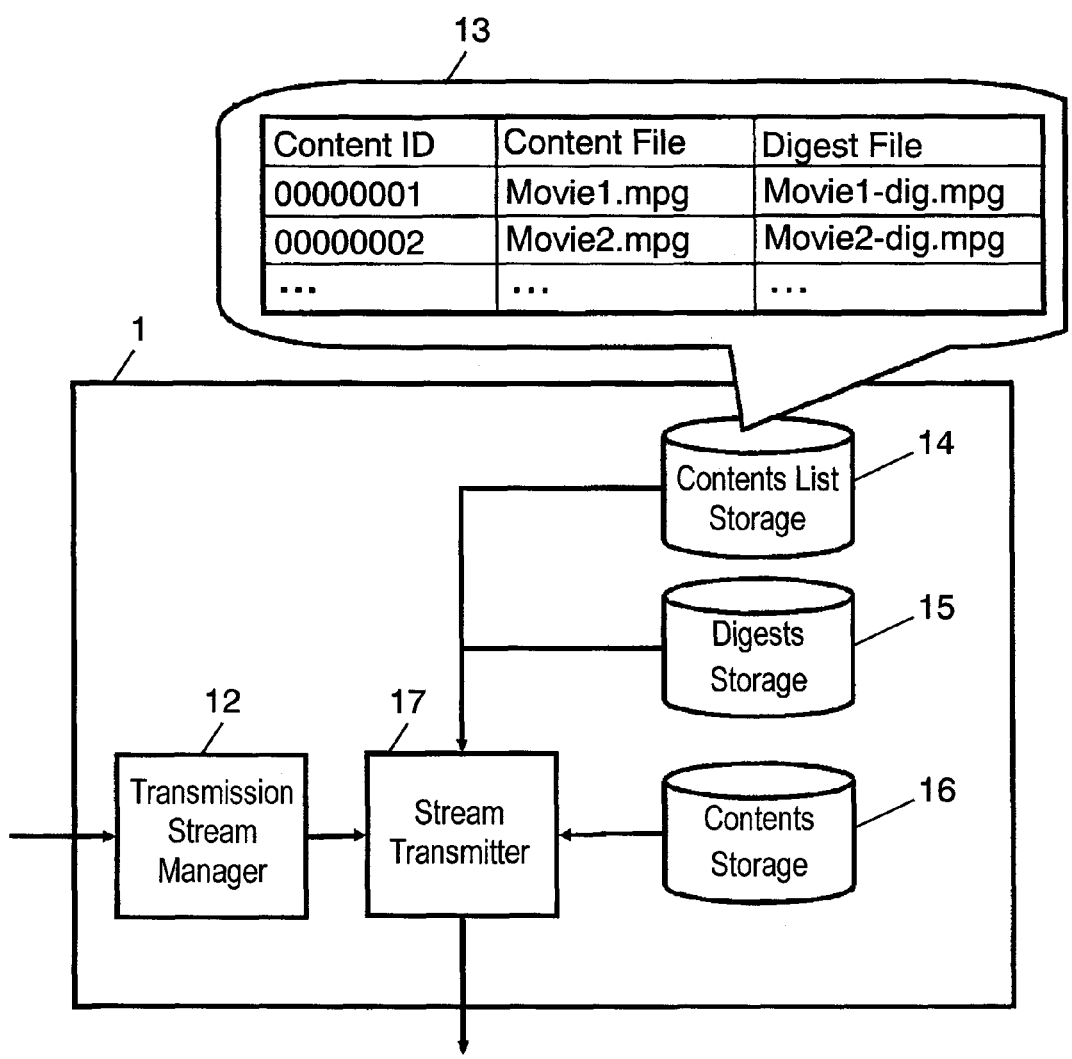
FIG. 2 is a diagram showing an internal structure of a video server according to the first preferred embodiment of the present invention.

FIG. 2 is a diagram showing an internal structure of video server 1.

In FIG. 2, transmission stream manager 12 receives a request for a digest stream or a body stream from client machine 3 and selects a stream to be transmitted in response to the request.

Here, the digest is defined by a predetermined time length of any part cut out from each of the video contents stored in video server 1, or by a predetermined time length of a combination of plural short pieces cut out from each of the contents. The digest can be arbitrarily determined with respect to a rule of the cutout from the video contents, broadcasting time of the digest or the like as long as the digest is suited for a user's recognition of the video contents. The digest stream is defined by a stream data that, in sequence, combines the digests formed of respective video contents in the above-stated manner to be transported as a single stream to the client machine.

Figure 3:
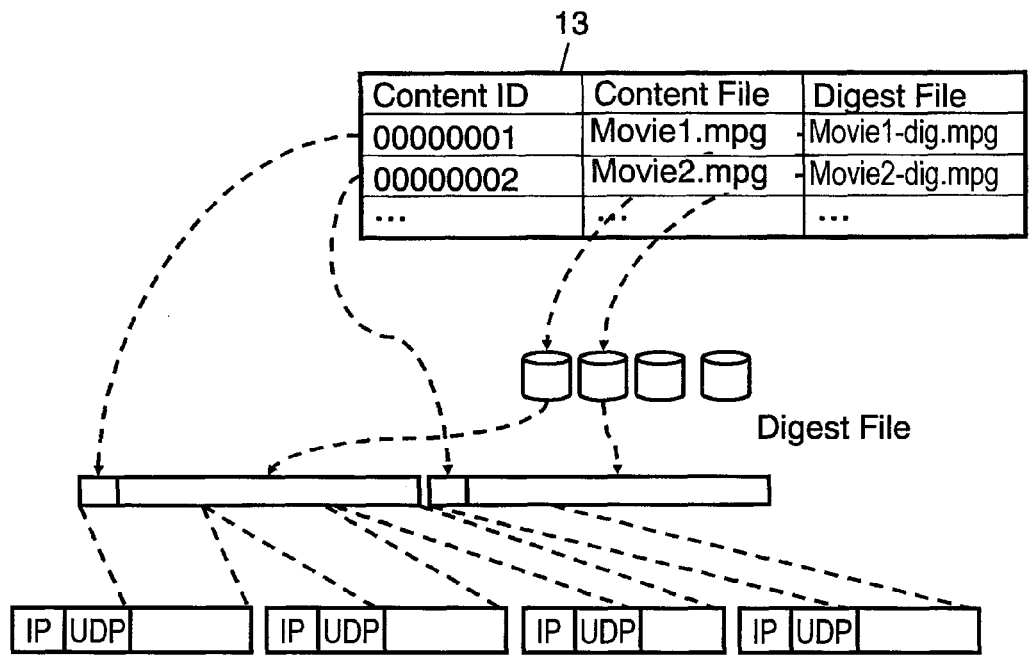
FIG. 3 is a diagram showing a structure of a digest stream according to the first preferred embodiment of the present invention.

FIG. 3 is a diagram showing the structure of the digest stream.

As FIG. 3 shows, the digest stream is stored as sequential sets each formed of a content ID and a predetermined time length of a digest file, on the basis of contents list 13 stored in contents list storage 14. Once all the contents stored in the contents list 13 have been transmitted, the transmission of the digests will return to the head of the contents list 13 and start again. In this case, packets may be varied in length so as to place each of the content IDs at the head of a packet, facilitating extracts of the content IDs.

The body is defined by a body of a video content stored in video server 1, and the body stream is defined by a stream data that transports the body to the client machine.

Contents list 13 is stored in contents list storage 14. Contents list 13 is a list that enables a view of the contents stored in video server 1, and records content IDs for identifying the respective video contents, content file names (e.g., "content name.mpg") and digest file names (e.g., "content name-digest.mpg") while relating them to each other.

Contents storage 16 records the files of various video contents (the file name is "content name.mpg", for example) therein. This contents storage 16 may be anything capable of storing the video contents, such as a tape medium, a disc medium or a memory. Digests storage 15 records the digest files of the contents stored in contents storage 16 (the file name is "content name-digest.mpg", for example) therein. This digests storage 15 may be anything capable of storing the video contents, as well as contents storage 16.

Stream transmitter 17 generates the digest stream and transmits the same to client machine 3 in accordance with an instruction from transmission stream manager 12. When the instruction from transmission stream manager 12 requests the transmission of the body stream, stream transmitter 17 searches contents list 13 for the instructed body stream, reads out the body stream from contents storage 16, and transmits the same to client machine 3. Alternatively, when the instruction from transmission stream manager 12 requests the transmission of the digest stream, stream transmitter 17 searches contents list 13 for the instructed digest stream, combines digests read out from digests storage 15 in an order instructed by contents list 13, and transmits the combined digests to client machine 3.

Figure 4:
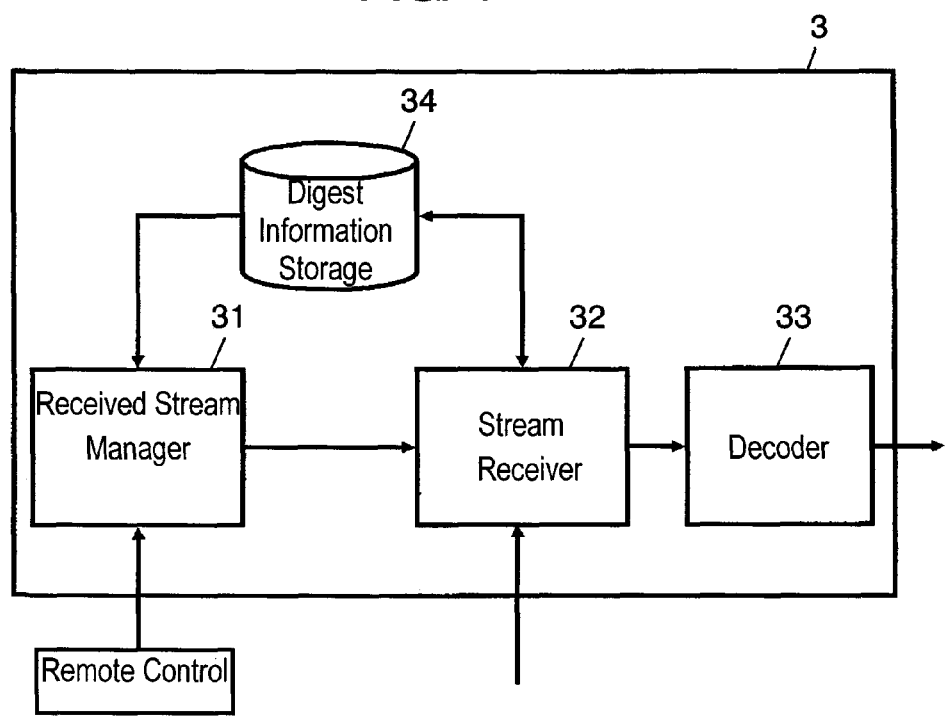
FIG. 4 is a diagram showing an internal structure of a client machine according to the first preferred embodiment of the present invention.

FIG. 4 is a diagram showing an internal structure of client machine 3.

In FIG. 4, received stream manager 31 sends a request for the digest stream or the body stream to video server 1 in response to a user operation, such as an operation of a remote control. Stream receiver 32 sends a request for the digest stream or the body stream instructed from received stream manager 31 to video server 1, receives the digest stream or the body stream transmitted from video server 1, and passes the same to decoder 33. Decoder 33 decodes the digest stream or the body stream received by stream receiver 32, and transmits the same to an image display, which is not illustrated.

Digest information recorder 34 detects the content IDs, which identify the video contents (i.e., the body) respectively original of the digests, from the digests included in the digest stream that is being received, and stores the same therein. The stored content ID is renewed every time when one of the content IDs is detected from the digest stream, and therefore, always records the content ID of the video content original of the digest that the client machine is receiving at present.

When a user who is viewing the digest stream finds out the user's desired video content among the digests included in the digest stream, the user can request a playback of the desired body video content by using an interface, such as a remote control (or a switch or a touch-sensitive panel provided on the client machine). As a result, received stream manager 31 receives a request for the body stream from the remote control, and sends a request for the body stream to video server 1 by use of the content ID of the video content (i.e., the body), which is original of the digest recorded in digest information recorder 34. Stream receiver 32 receives the body stream instructed by received stream manager 31 from video server 1, passes the same to decoder 33. Decoder 33 decodes the body stream received by stream receiver 32 and transmits the same to the not-illustrated image display.

This configuration allows a user to view the digest stream, which is compiled only from the parts of the plural contents stored in the storage, and therefore, allows the user to select the video content to suit the user's taste appropriately unlike in selecting the content only by viewing still images. Further, since the video server generates and transmits the digest stream only in response to the request from the user, the video server only has to generate the digest stream when necessary. This can reduce a load on the video server and also reduce the bandwidth load on a communication line connected to the video server. Still further, the user who has found out the desired program in the digest stream can start the playback of the body video content only by conveying the user's selection on the client machine side by using the remote control or the like.

There will, hereinafter, be described communication between video server 1 and client machine 3 in the video delivery system according to the first preferred embodiment in detail.

Figure 5:
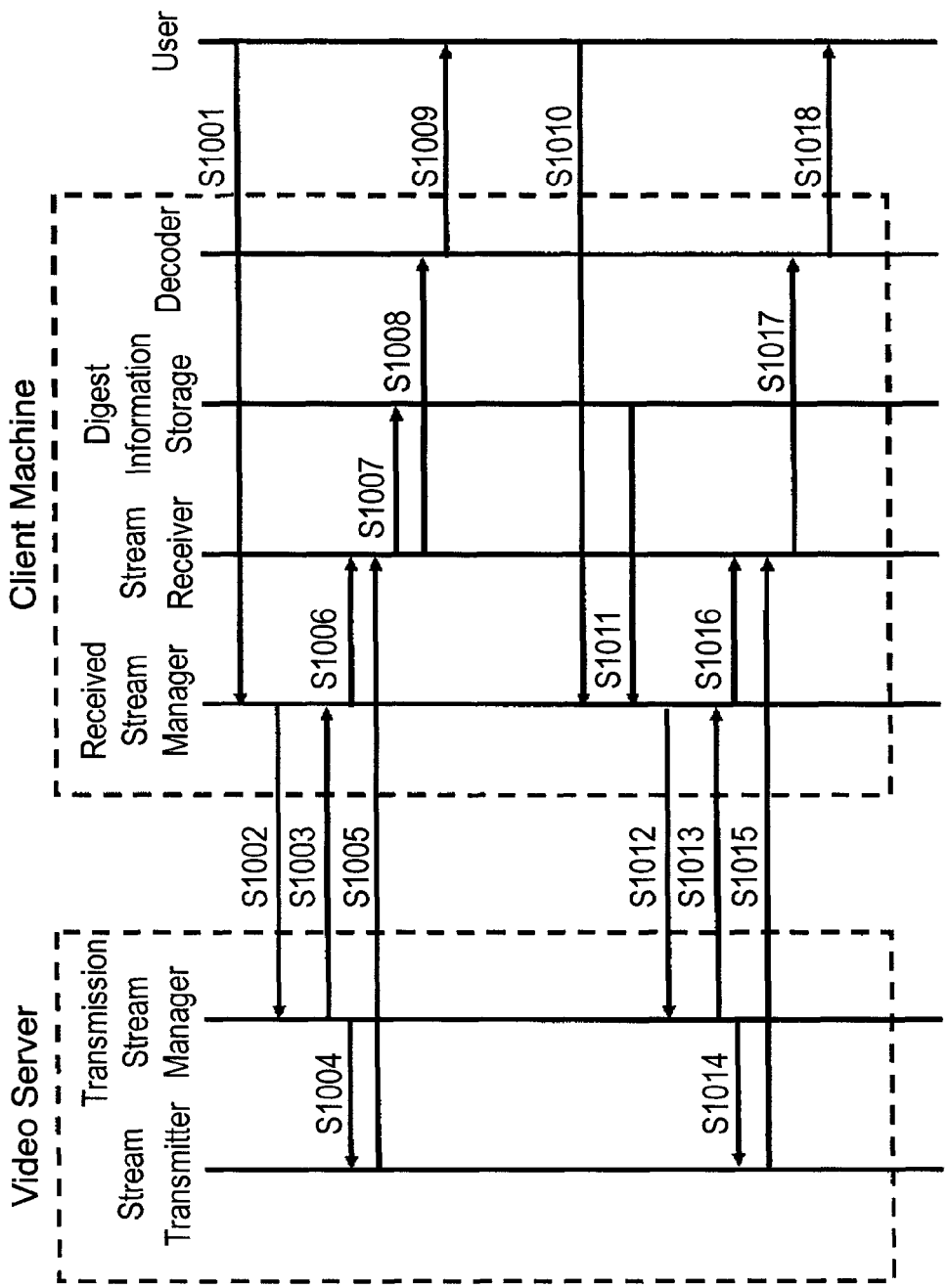
FIG. 5 is a timing chart explaining information exchange between the video server and the client machine according to the first preferred embodiment of the present invention.

FIG. 5 is a timing chart explaining information exchange between the video server and the client machine according to the first preferred embodiment of the present invention.

First, as a user presses a "digest" key on a remote control or the like attached to client machine 3, received stream manager 31 in client machine 3 detects an input event of the digest key via a remote control light sensor, which is not illustrated (step S1001).

Received stream manager 31 in the client machine sends a "digest information request" which is a request for information on the digest stream to transmission stream manager 12 in video server 1 (step S1002). The "digest information request" includes a port number provided by the client machine for receiving the digest stream. The reception port number is required when the body is received on a UDP basis, whereas not required when the digest stream is received on a TCP basis, such as on an HTTP basis, and therefore does not have to be included.

Transmission stream manager 12 in video server 1 sends information on the digest stream as a "digest information response" to received stream manager 31 in client machine 3 in response to the "digest information request" from received stream manager 31 (step S1003). The "digest information response" includes information on whether the "digest information request" has arrived or not and stream information including a transmission rate (optional).

Transmission stream manager 12 in video server 1 notifies an IP address of client machine 3 and the reception port number (acquired from the "digest information request") to stream transmitter 17 (step S1004). Stream transmitter 17, on receiving the same, generates the digest stream and transmits the generated digest stream to the notified IP address and reception port number (step S1005).

At the same time, received stream manager 31 in client machine 3 notifies the reception port number (the number notified to the video server at step S1002) and the stream information (acquired from the "digest information response") to stream receiver 32 (step S1006).

Stream receiver 32 in client machine 3 receives the digest stream indicating the notified IP address and the reception port number from stream transmitter 17 in client machine 3, records content IDs on a timely basis that identify the video contents (i.e., the bodies) respectively original of the digests included in the digest stream in digest information recorder 34 (step S1007), and supplies the digest files included in the digest stream to decoder 33 (step S1008).

Decoder 33 in client machine 3 decodes the digest files received from stream receiver 32, and sends the decoded files to the not-illustrated display in a TV set or the like to output audio and video (step S1009).

Next, there will be described a case that the user, viewing the digest stream, finds out his/her desired program and presses a decision key on the remote control or the like.

In this situation, received stream manager 31 in client machine 3 detects an input event of the decision key via the not-illustrated light sensor (step S1010). By detecting the input event, received stream manager 31 acquires, from digest information recorder 34, content ID included in a digest that is being received at the present (step S1011).

Next, received stream manager 31 in client machine 3 sends a "body playback request" for requesting transmission of the body stream to transmission stream manager 12 in video server 1 (step S1012). The "body playback request" here includes the content ID that received stream manager 31 has received from digest information recorder 34 at step S1011, and the port number of client machine 3 for receiving the body. The reception port number is not required when the body stream is received on the TCP basis, such as on the HTTP basis, like in requesting the digest information.

Transmission stream manager 12 in video server 1 sends a "body playback response" regarding the playback of the body stream to received stream manager 31 in client machine 3 in response to the "body playback request" from received stream manager 31 (step S1013). The "body playback response" includes information on whether the "body playback request" has arrived or not and stream information (optional) including a transmission rate.

Transmission stream manager 12 in video server 1 notifies an IP address and the body reception port number of client machine 3, and the content ID (acquired from the "body playback request") to stream transmitter 17 (step S1014). Stream transmitter 17 searches contents list 13 for a body file corresponding to the content ID, reads out the body file from contents storage 16, generates the body stream, and transmits the generated body stream to stream receiver 32 in client machine 3 (step S1015).

Received stream manager 31 in client machine 3 notifies the body reception port number (the number notified to video server 1 at step S1012) and the stream information (acquired from the "body playback response") to stream receiver 32 (step S1016). Stream receiver 32 receives the body stream indicating the notified IP address and the body reception port number, and passes the same to decoder 33 (step S1017). Decoder 33 decodes the received body file and supplies the audio and video to the not-illustrated display in the TV or the like (step S1018).

The video delivery system according to the first preferred embodiment has been described as an example and is not restricted to such an example.

For example, RTSP (Real Time Streaming Protocol) may be applied to the "digest information request", the "digest information response", the "body playback request" and the "body playback response". Specifically, steps S1002, S1003, S1010 and S1011 can be implemented according to the DESCRIBE, SETUP and PLAY methods of RTSP. In this case, the URI of the content included in the PLAY method can be designated as follows.

Digest: rtsp://IP of video server/digest.mpg
Body: rtsp://IP of video server/content ID.mpg HTTP (HyperText Transfer Protocol) can instead be applied to the "digest information request", the "digest information response", the "body playback request" and the "body playback response". This allows even the body itself to be acquired according to HTTP, thus simplifying the steps.

Further, although the content ID exemplified above is supposed to be about four bytes in data length, it may be replaced with the URI or the like. The URI can be used as it is to acquire the body according to RTSP or HTTP.

Further more, the above-described example renews the content ID at the timing when detecting a new one in the digest stream. This timing is earlier than that of the new digest being displayed on the TV set due to a buffer and/or some others. The digest displayed on the TV set may, therefore, differ from the digest corresponding to the digest ID recorded in the digest information recorder at the time a user presses the decision key. To prevent such a time lag, the digests may be generated by use of BML (Broadcast Markup Language) in which the URIs of the bodies and some others are written so that the synchronization with the timing of display on the TV set is implemented.

In addition, the first preferred embodiment has been described as applied to a home network. The present invention can, however, be applied to such a system that a dedicated home client machine accesses a video server provided by a video content delivery service provider over the Internet.

Second Preferred Embodiment

A second preferred embodiment, there will be described on the assumption that: a single video server and plural client machines are connected to a home network; a user of a client machine A sends a request for a digest stream to the video server; thereafter a user of a client machine B also sends a request for a digest stream; then the client machine A selects a body; the client machine B stops receiving the digest stream; and the video server confirms no presence of receivers of the digest stream and stops transmitting the digest stream.

The second preferred embodiment will be described on the further assumption that the video server delivers the digest stream by multicast, because the video server and the client machines are in a one-to-plural relationship. Unicast and broadcast deliveries are, however, also applicable depending on the number of the client machines and a bandwidth capability of a communication line connected to the video server.

Figure 6:
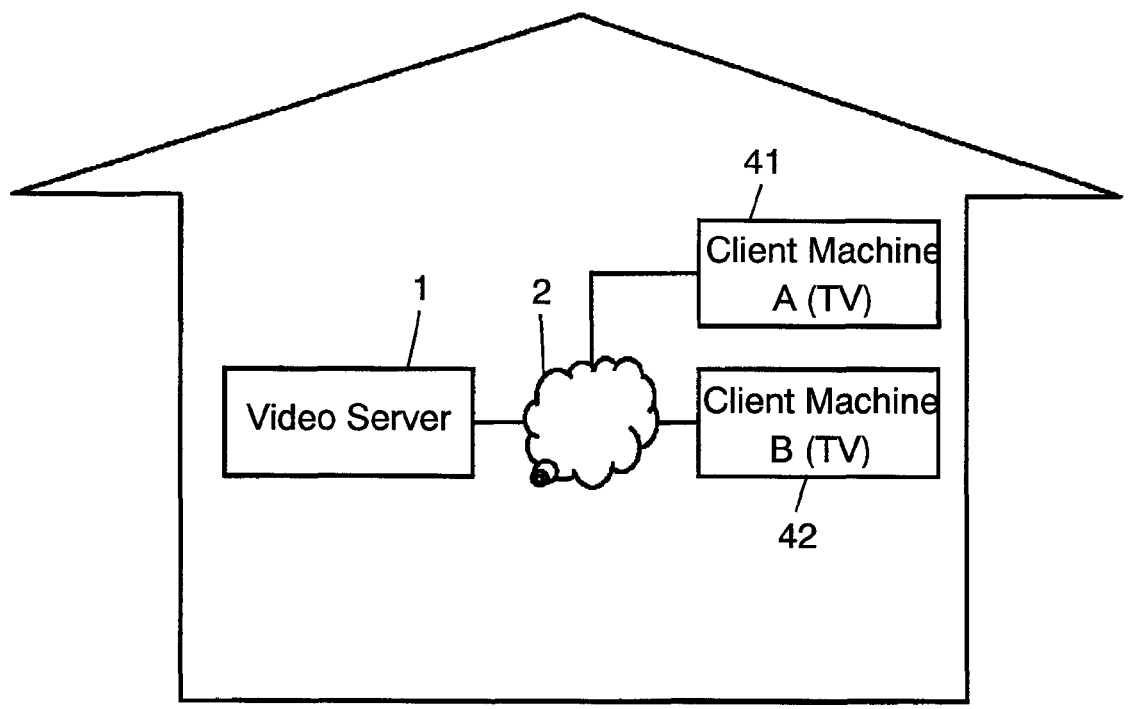
FIG. 6 is a diagram schematically showing a video delivery system according to a second preferred embodiment of the present invention.

FIG. 6 is a diagram schematically showing a video delivery system that utilizes a video server and a client machine according to the present invention.

In FIG. 6, video server 1 and client machine A (TV) 41 are placed in a family room, client machine B (TV) 42 is placed in a bedroom, and they are connected to wired or wireless network 2.

Client machine A 41 and client machine B 42 are exemplified by television sets (TV) or personal computers (PC), whereas they are not restricted to such examples. Other device is the same as the counterpart described with reference to FIG. 1 in the first preferred embodiment, and therefore, the device will not be described here again.

Figure 7:
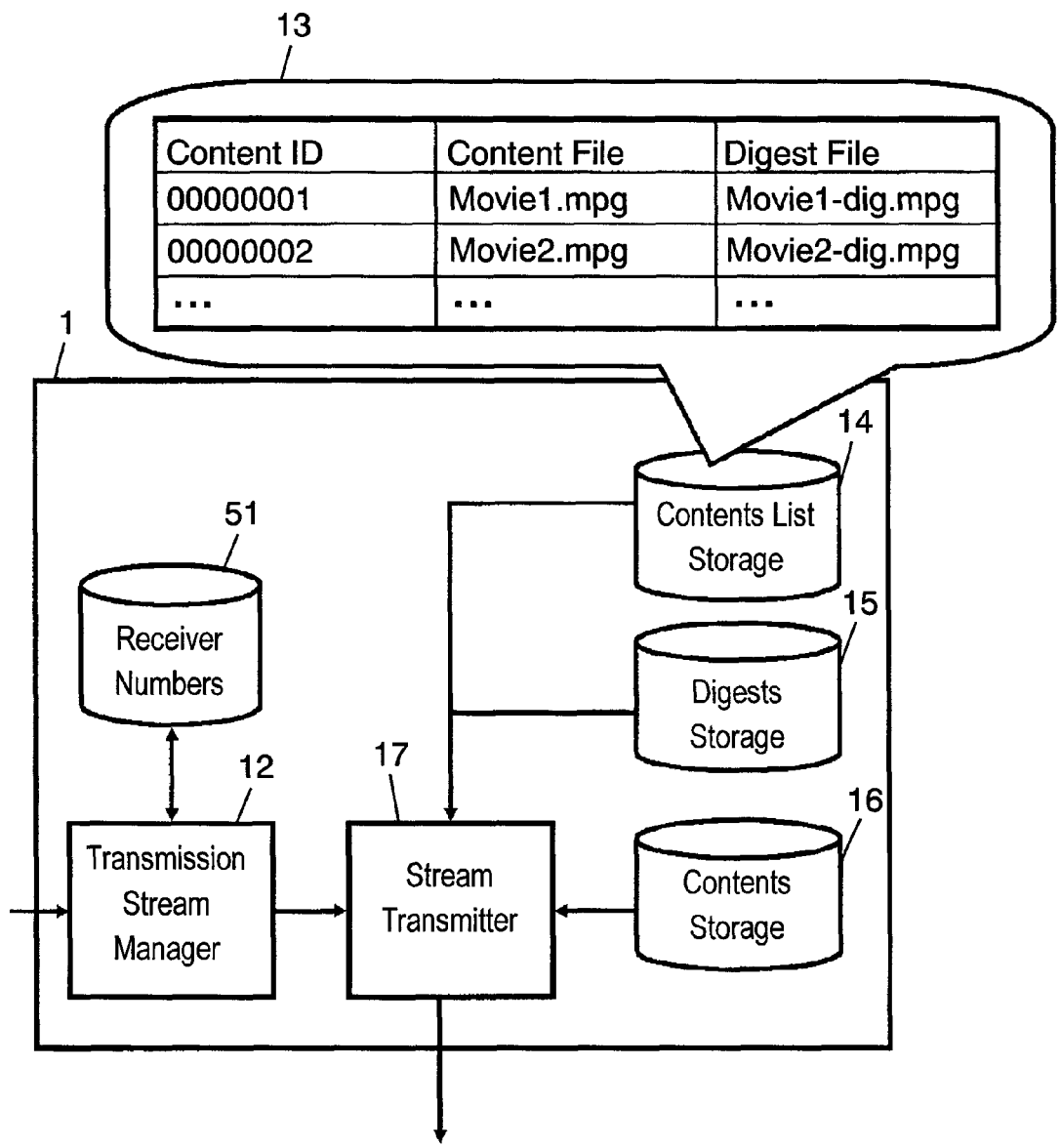
FIG. 7 is a diagram showing an internal structure of a video server according to the second preferred embodiment of the present invention.

FIG. 7 is a diagram showing an internal structure of video server 1.

In FIG. 7, receiver numbers recorder 51 counts the number of client machines that are receiving the digest stream as receivers. As the number of receivers becomes zero, the digest stream stored in a memory inside of stream transmitter 17 is erased in accordance with an instruction from transmission stream manager 12.

The configurations of other components in video server 1 and of client machine 3 are the same as the counterparts in the first preferred embodiment, and therefore detailed descriptions thereof will be omitted.

Figure 8:
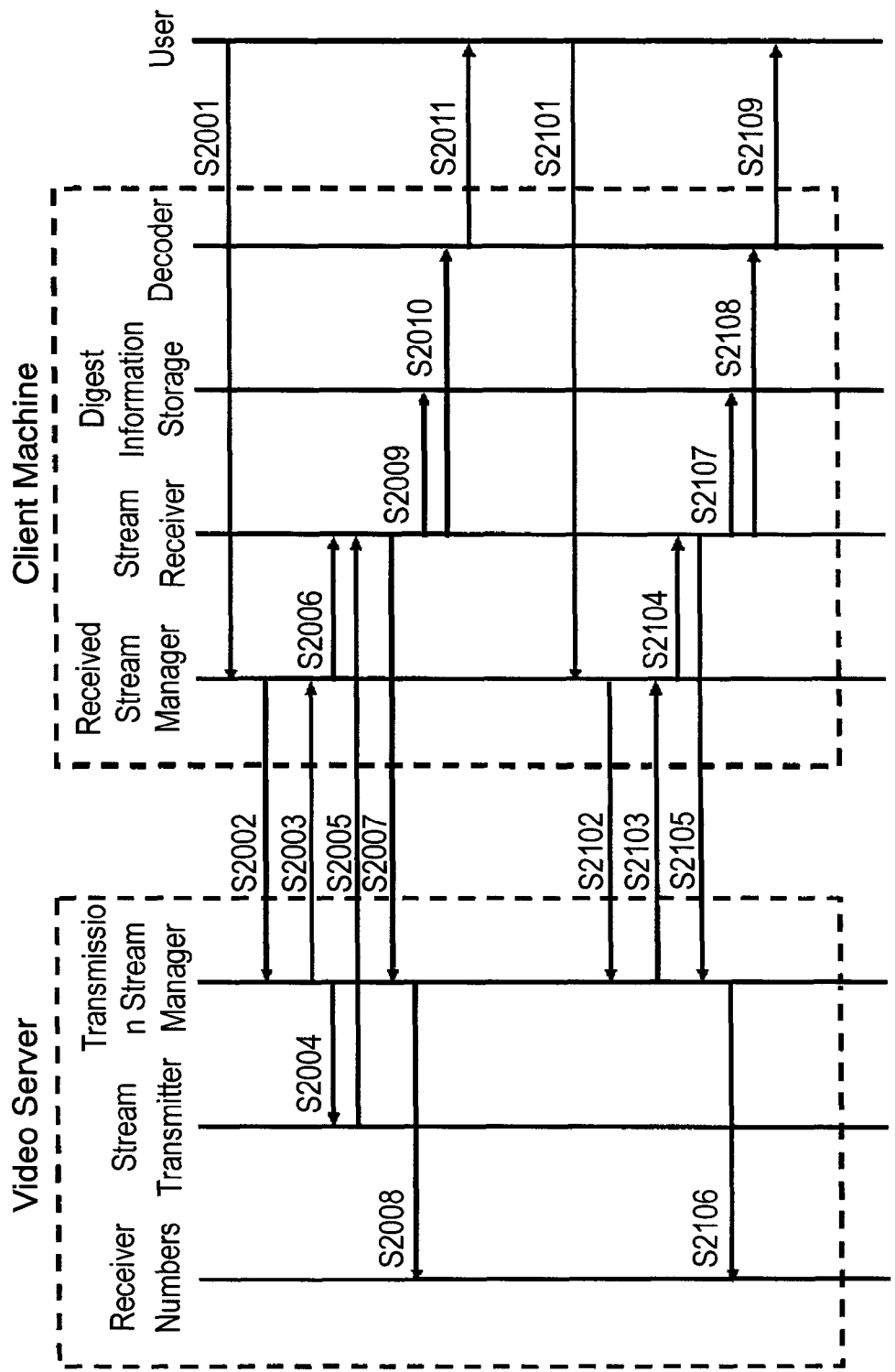
FIG. 8 is a timing chart explaining information exchange between the video server and a client machine according to the second preferred embodiment of the present invention.
Figure 9:
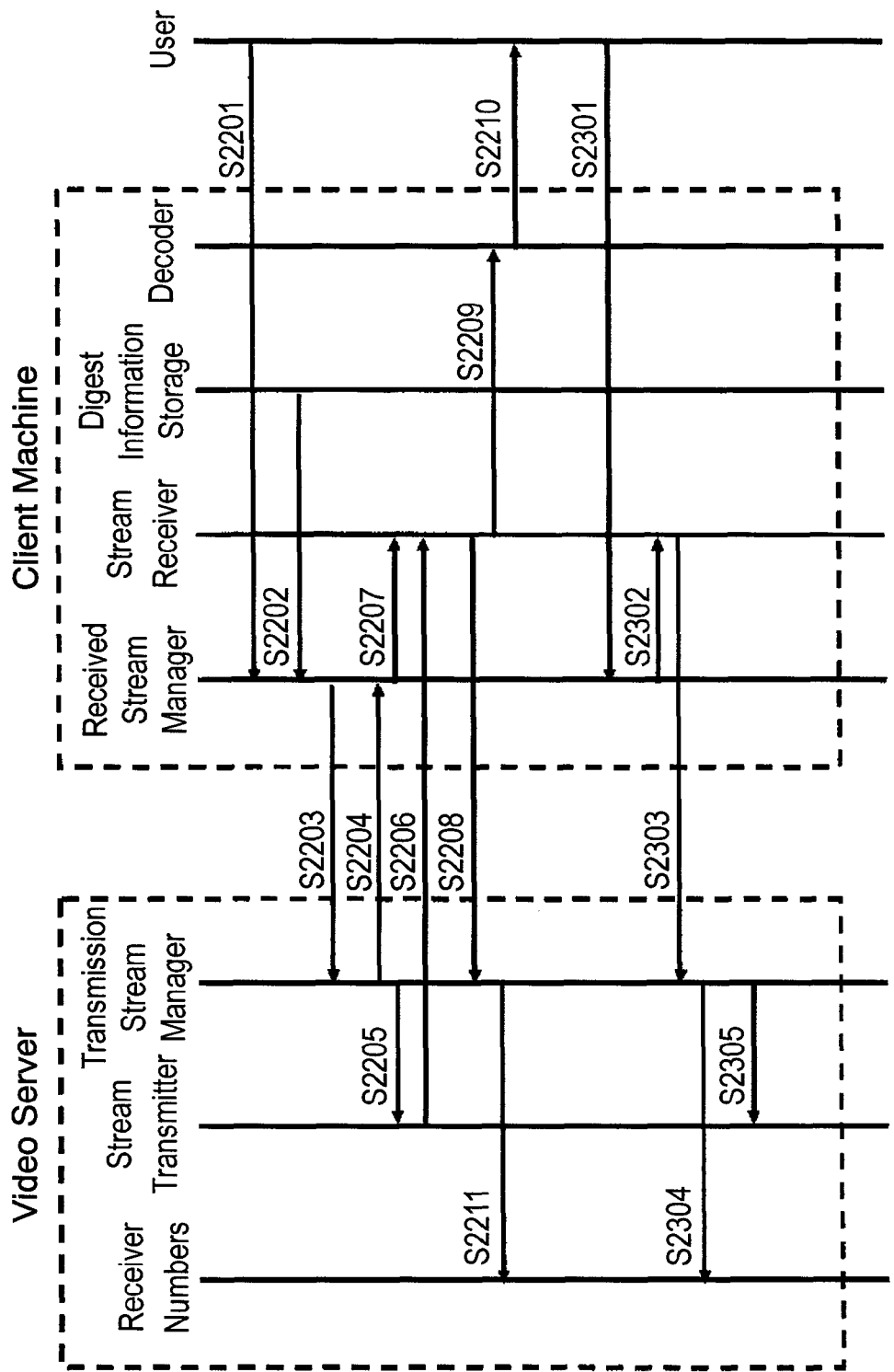
FIG. 9 is a timing chart explaining the information exchange between the video server and the client machine according to the second preferred embodiment of the present invention.

FIGS. 8 and 9 are timing charts explaining the sequence of information exchange between video server 1, client machine A 41 and client machine B 42 according to the second preferred embodiment of the present invention.

First, as a user presses a "digest" key on a remote control attached to client machine A 41, received stream manager 31 in client machine A 41 detects an input event of the digest key via a remote control light sensor, which is not illustrated (step S2001).

Received stream manager 31 in client machine A 41 sends a "digest information request" which is a request for information on the digest stream to transmission stream manager 12 in video server 1 (step S2002). The "digest information request" does not include information on a port number for receiving the digest stream, unlike in the first preferred embodiment.

Transmission stream manager 12 in video server 1 sends information on the digest stream as a "digest information response" to received stream manager 31 in client machine A 41 in response to the "digest information request" from the received stream manager 31 (step S2003). The "digest information response" includes information on whether the "digest information request" has arrived or not, a receiver multicast address and a port number of the digest stream, and stream information (optional) including a transmission rate.

Transmission stream manager 12 in video server 1 notifies the receiver multicast address and the port number of the digest to stream transmitter 17 (step S2004). Stream transmitter 17 in video server 1 generates the digest stream and transmits the generated digest stream to the notified multicast address and the port number (step S2005).

At the same time, received stream manager 31 in client machine A 41 notifies the multicast address and the port number of the digest stream and the stream information (acquired from the "digest information response") to stream receiver 32 (step S2006).

Stream receiver 32 in client machine A 41 sends a "stream reception notification", which notifies the start of receiving the digest stream, to transmission stream manager 12 in video server 1 (step S2007). The "stream reception notification" includes the receiver multicast address and the receiver port number of a body stream that client machine A 41 has started to receive.

Transmission stream manager 12 in video server 1, on receiving the "stream reception notification", increments a counter in receiver numbers recorder 51 by one (step S2008). Since client machine A 41 is supposed to have requested the digest stream for the first time, the counter in receiver numbers recorder 51 is incremented from "0" to "1" in the second preferred embodiment.

Stream receiver 32 in client machine A 41 receives the digest stream indicating the notified multicast address, records content IDs on a timely basis that identify the video contents (i.e., the bodies) respectively original of the digests included in the digest stream in digest information recorder 34 (step S2009), and passes the digest files included in the digest stream to decoder 33 (step S2010).

Decoder 33 in client machine A 41 decodes the digest files received from stream receiver 32, and sends the decoded files to the not-illustrated display in a TV set or the like to output audio and video (step S2011).

Next, there will be described a sequence that, while client machine A 41 is receiving the digest stream, a user presses a "digest" key on a remote control attached to client machine B 42, and in consequence, client machine B 42 sends a request for the digest stream to video server 1.

First, received stream manager 31 in client machine B 42 detects an input event of a digest key (step S2101), and sends a "digest information request" to transmission stream manager 12 in video server 1 (step S2102).

Then transmission stream manager 12 in video server 1 sends a "digest information response" to received stream manager 31 in client machine B 42 in response to the "digest information request" (step S2103). The "digest information response" here includes information on whether the "digest information request" has arrived or not, a receiver multicast address and a port number of the digest stream, which has already been supplied to client machine A 41, and stream information (optional) including a rate.

Received stream manager 31 in client machine B 42 notifies the receiver multicast address and the port number of the digest stream and the stream information (acquired from the "digest information response") to stream receiver 32 (step S2104). Stream receiver 32 sends a "stream reception notification" to transmission stream manager 12 in video server 1 (step S2105). The "stream reception notification" includes the receiver multicast address and the receiver port number of the digest stream that client machine B 42 receives.

Transmission stream manager 12 in video server 1, on receiving the "stream reception notification" from client machine B 42, increments a counter in receiver numbers recorder 51 (step S2106). Since client machine B 42 is supposed to start to receive the same digest after client machine A 41 does, the counter in receiver numbers recorder 51 is incremented from "1" to "2" in the second preferred embodiment.

Like in client machine A 41, stream receiver 32 in client machine A 41 receives the digest stream indicating the notified multicast address, records content IDs on a timely basis that identify the digests included in the digest stream in digest information recorder 34 (step S2107), and passes the digest files included in the digest stream to decoder 33 (step S2108). Further, decoder 33 decodes the received digest files to output audio and video (step S2109).

In this configuration, client machine B 42 can receive the same digest stream that video server 1 has already been transmitting to client machine A 41. Stream transmitter 17 in video server 1, therefore, does not have to generate a different digest stream in response to each request. This reduces a load on the server. This configuration also reduces the bandwidth load on a communication line connected to video server 1 unlike the configuration that video server 1 generates a different digest stream in response to each request and transmits the same to each client machine by unicast (UDP).

Hereinafter, a sequence that, while client machines A 41 and B 42 are receiving the digest stream from video server 1, a user of client machine A 41 selects the body will be described with reference to FIG. 9.

In this situation, received stream manager 31 in client machine A 41 detects an input event of a decision key via a remote control light sensor, which is not illustrated (step S2201). In consequence, received stream manager 31 acquires, from digest information recorder 34, a content ID corresponding to a digest that is being received at the present (step S2202).

Next, received stream manager 31 in client machine A 41 sends a "body playback request" for requesting transmission of the body stream to the transmission stream manager in video server 1 (step S2203). The "body playback request" here includes a content ID that received stream manager 31 has received from digest information recorder 34 at step S2202, and the IP address and the body reception port number of client machine A 41.

Transmission stream manager 12 in video server 1 sends a "body playback response" regarding the playback of the body stream to received stream manager 31 in client machine A 41 in response to the "body playback request" from reception stream manager 31 in client machine A 41 (step S2204). The "body playback response" includes information on whether the "body playback request" has arrived or not and stream information (optional) including a transmission rate.

Transmission stream manager 12 in video server 1 notifies the IP address and the body reception port number of client machine A 41, and the content ID (acquired from the "body playback request") to stream transmitter 17 (step S2205). Stream transmitter 17 searches contents list 13 for a body file corresponding to the content ID, reads out the body file from contents storage 16, generates a body stream, and transmits the generated body stream to stream receiver 32 in client machine A 41 (step S2206).

Received stream manager 31 in client machine A 41 notifies the body reception port number (the number notified to video server 1 at step S2203), the stream information (acquired from the "body playback response") and an instruction to complete receiving the digest stream to stream receiver 32 (step S2207). Stream receiver 32 starts to receive the body stream indicating the notified IP address and the reception port number.

Stream receiver 32 in client machine A 41 stops receiving the digest stream and sends a "stream reception discard notification" indicating the completion of receiving the digest stream to transmission stream manager 12 in video server 1 in accordance with the instruction to complete receiving the digest stream from received stream manager 31 (step S2208). Stream receiver 32 receives the body stream indicating the notified IP address and reception port number and passes the same to decoder 33 (step S2209). Decoder 33 decodes the received body file to output audio and video to a display in a TV set or the like, which is not illustrated (step S2210).

Transmission stream manager 12 in video server 1, on receiving the "stream reception discard notification" from client machine A 41, decrements the counter in receiver numbers recorder 51 by one (step S2211). Since client machines A 41 and B 42 are supposed to be receiving the digest stream, the counter in receiver numbers recorder 51 is decremented from "2" to "1" in the second preferred embodiment.

Next, there will be described a sequence that client machine B 42 stops receiving the digest stream.

Received stream manager 31 in client machine B 42 detects an instruction input event of stopping the view of the digest stream from the user via a not-illustrated remote control light sensor (step S2301). The user may give an instruction to stop the view of the digest stream by use of a switch dedicated to stopping the view of the digest stream or a switch for combined purposes of switching to terrestrial broadcasts and stopping the view of the digest stream. Further, the instruction input event may be sent in such a case that a power switch of the client machine is turned off.

On receiving the instruction to stop the view of the digest stream, received stream manager 31 in client machine B 42 notifies an instruction to stop the reception of the digest stream to stream receiver 32 (step S2302). Stream receiver 32 stops receiving the notified digest stream and sends a "stream reception discard notification" to transmission stream manager 12 in video server 1 (step S2303).

On receiving the "stream reception discard notification" from client machine B 42, transmission stream manager 12 in video server 1 decrements the counter in receiver numbers recorder 51 (step S2304). Since only client machine B 42 has still been receiving the digest stream, the counter in receiver numbers recorder 51 is decremented from "1" to "0." Further, transmission stream manager 12 in video server 1 notifies an instruction to stop the transmission of the digest stream to stream transmitter 17. Stream transmitter 17 in video server 1 stops transmitting the digest stream (step S2305).

Transmission stream manager 12 in video server 1 determines that there exists no client that is receiving the digest stream and notifies an instruction to discard the digest stream to stream transmitter 17 at the timing when the counter in receiver numbers recorder 51 becomes "0." On receiving this instruction, stream transmitter 17 erases the digest stream from a memory inside thereof.

Thus, monitoring the number of client machines that are receiving the digest stream, the system can erase the digest stream stored in the video server when it finds no existence of client machine that is receiving the digest stream, and therefore, the system can reduce a load on the memory inside of the video server.

The video delivery system according to the second preferred embodiment has been described as an example and is not restricted to such an example.

For example, RTSP may be applied to the "digest information request", the "digest information response", the "body playback request" and the "body playback response" as well as in the first preferred embodiment.

Further, although the "stream reception notification" and the "stream reception discard notification" are sent to transmission stream manager 12 in the video server by stream receiver 32 in the client machine (steps S2007, S2105, S2208 and S2303) in the second preferred embodiment, these notifications can be replaced with the "join" and "leave" methods of IGMP. In this case, such an extension of the join method of TGMP as to include a port number therein will enable the port number to be instructed as well.

Further more, the number of receivers of the digest stream can also be counted by a query message for confirming the receiver numbers of the digest stream being transmitted from video server 1 to client machines A 41 and B 42 and by the number of responses to the query being counted (at the end of step S2109, for example), without the "stream reception notification" and the "stream reception discard notification" being sent from stream receiver 32 in client machines A 41 and B 42 to transmission stream manager 12 in the video server.

This configuration enables even a client machine that has stopped receiving the digest stream without sending the "stream reception discard notification" to the video server for some reason to be counted into the receiver numbers.

In addition, the second preferred embodiment has been described as applied to a home network. The present invention can, however, be applied to such a system that a dedicated home client machine accesses a video server provided by a video content delivery service provider over the Internet.

Third Preferred Embodiment

A third preferred embodiment will be described on the assumption that: a video server held by a broadcasting service provider and plural client machines held by plural families are connected to a network; while client machines A and B are receiving a digest stream delivered by the video server, the client machine A requests a skip/reverse stream; the video server, in response to this request, newly transmits a skip/reverse stream α to client machine A; subsequently, the client machine B also requests the skip/reverse stream; and the video server, in response to this request, sends back information on the skip/reverse stream α to the client machine B and erases the digest stream, which no client has still been receiving.

The third preferred embodiment will be described on the further assumption that the video server delivers the digest stream by multicast, because the video server and the client machines are in a one-to-plural relationship. Unicast and broadcast deliveries are, however, also applicable depending on the number of the client machines and a bandwidth capability of a communication line connected to the video server.

Figure 10:
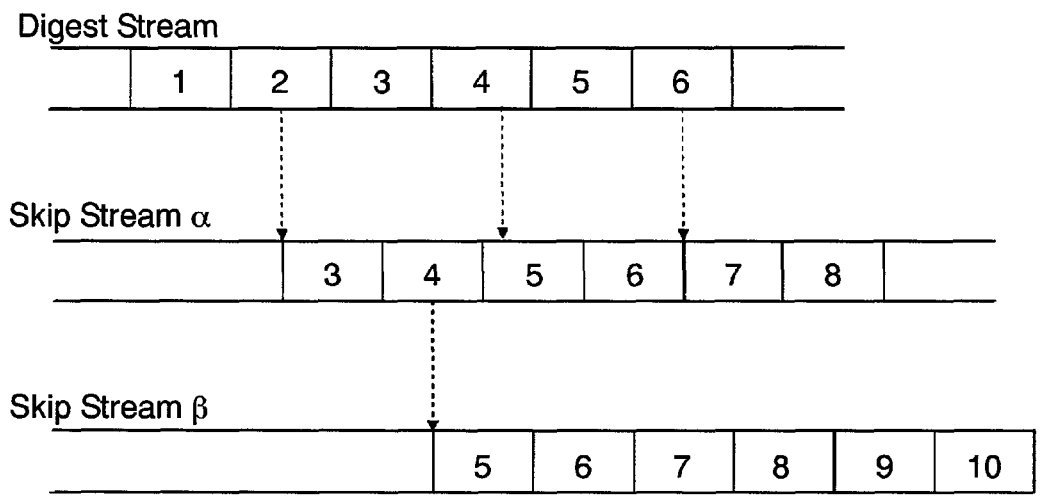
FIG. 10 is a diagram showing structures of streams according to a third preferred embodiment of the present invention.

As FIG. 10 shows, the skip stream is defined by a stream derived from the digest stream forwardly. Suppose that a user of a client machine, while viewing the digest stream that includes digests 1, 2, 3, 4, 5 and so on in sequence each continuing for 20 seconds, presses a skip button on a remote control after viewing digest 2 for 5 seconds to view the next digest. Then the video server generates a secondary digest stream that starts from digest 3 and transmits the same to the client machine. This secondary digest stream derived forwardly is here referred to as the skip stream.

Figure 11:
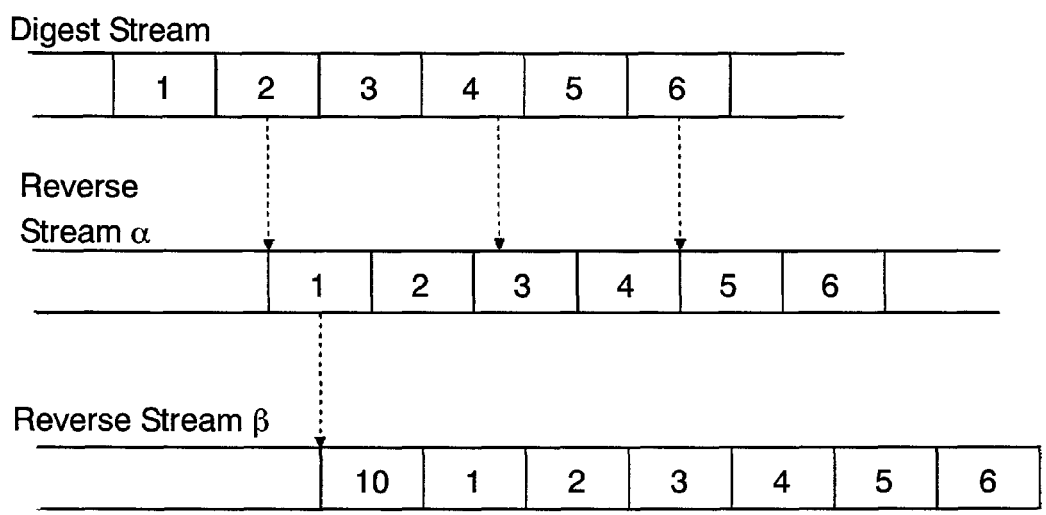
FIG. 11 is a diagram showing the structures of the streams according to the third preferred embodiment of the present invention.

Likewise, as FIG. 11 shows, suppose that a user of a client machine, while viewing the digest stream, which includes digests 1, 2, 3, 4, 5 and so on in sequence, presses a reverse button on a remote control to review the last digest in the midst of viewing digest 2. Then the video server generates a secondary digest stream that starts from digest 1 and transmits the same to the client machine. This secondary digest stream derived backwardly is here referred to as the reverse stream.

It should be noted that the skip streams and the reverse streams can be generated over any stages like streams α, β and so on.

Hereinafter, there will be exemplified a situation that a client machine requests a skip stream forwardly.

Figure 12:
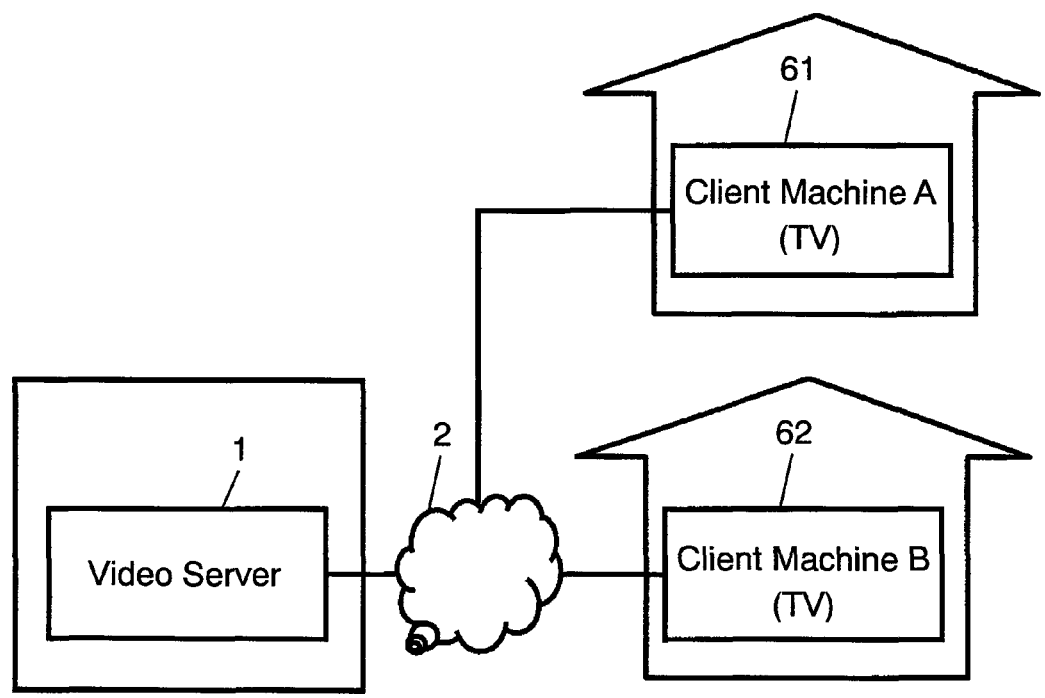
FIG. 12 is a diagram schematically showing a video delivery system according to the third preferred embodiment of the present invention.

FIG. 12 is a diagram schematically showing a video delivery system that utilizes a video server and a client machine according to the present invention.

In FIG. 12, video server 1 is held by a broadcasting service provider, and client machines A (TV) 61 and B (TV) 62 are placed in different houses. The three devices are connected to each other via wired or wireless network 2. Client machines A 61 and B 62 are exemplified by television sets (TV) or personal computers (PC), whereas they are not restricted to such examples. Other device is the same as the counterpart described with reference to FIG. 1 in the first preferred embodiment, and therefore, the device will not be described here again.

Figure 13:
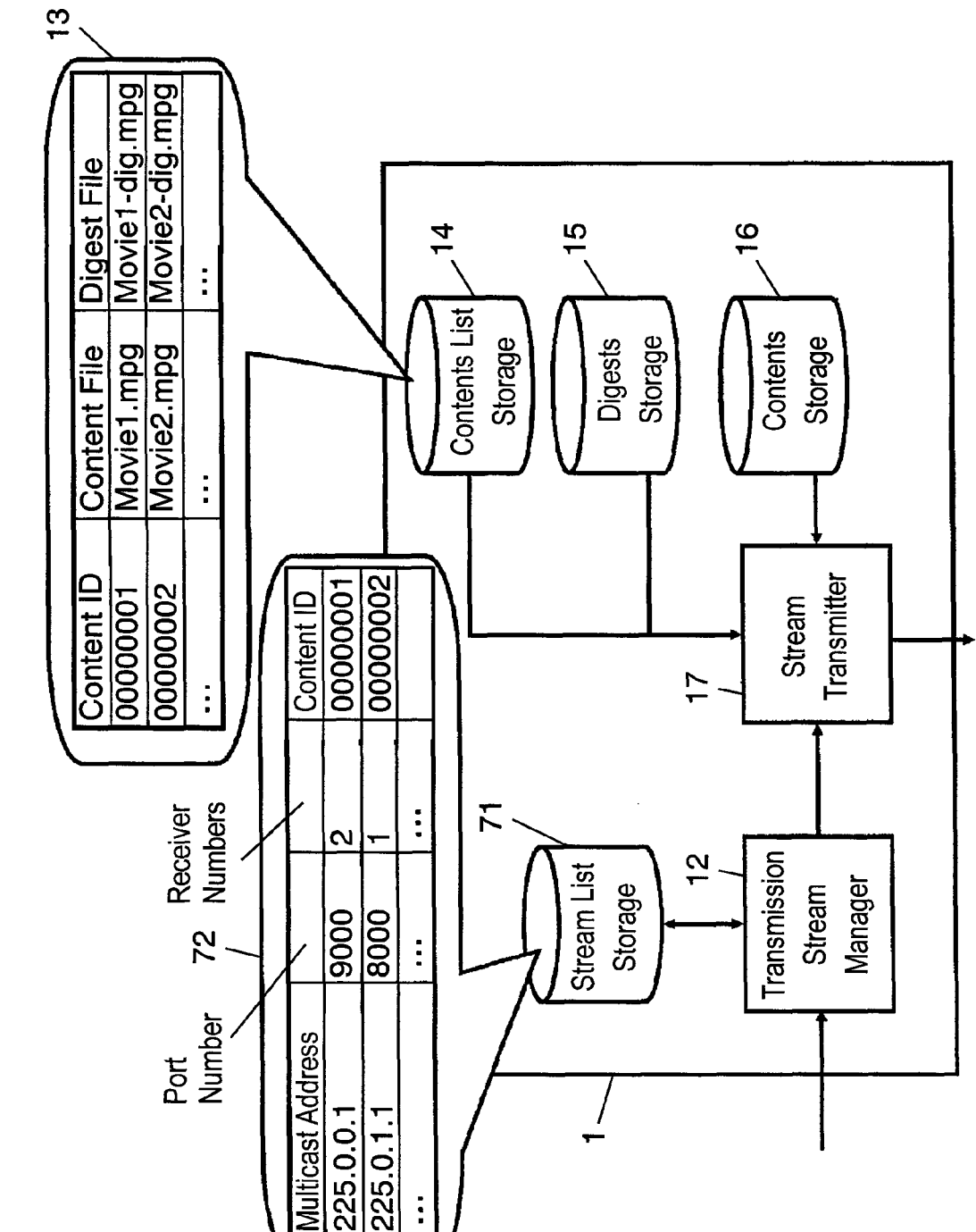
FIG. 13 is a diagram showing an internal structure of a video server according to the third preferred embodiment of the present invention.

FIG. 13 is a diagram showing an internal structure of video server 1.

In FIG. 13, stream list storage 71 holds stream list 72. Stream list 72 records multicast addresses, port numbers and the number of receivers of the digest streams/skip steams that are being transmitted, and content IDs of the digests that are just being transported by the streams. The recorded content IDs are renewed every time when the digests just being transported are changed, and are overwritten by the latest content IDs. The stream list, therefore, enables the system to find out the digests that are just being transported by respective digest/skip streams.

The video server, on receiving a request for a skip from a client machine, compares a content ID sent from the client machine with the stream IDs recorded in stream list 72, detects a skip stream requested by the client machine (i.e., a stream that is transporting a digest next to the digest corresponding to the content ID sent from the client machine), and transmits the detected skip stream to the client machine. If there is recorded no skip stream that the client machine requests in stream list 72, transmission stream manager 12 instructs stream transmitter 17 to generate a skip stream and transmit the same to the client machine. Transmission stream manager 12 renews such date in stream list 72 as the corresponding multicast address, port number, number of receivers of the stream and the content ID of the digest that is being transported by the stream. Content IDs and predetermined time lengths of digest files are carried on the skip stream in turn on the basis of the contents list stored in contents list storage 14, starting from the digest next to the digest corresponding to the content ID sent from the client machine.

If a viewer of a digest stream or a skip stream requests a skip to change the stream so that the number of receivers of the digest stream or the skip stream becomes zero, the corresponding digest stream or the skip stream is erased from a memory inside of video server 1. The configurations of other components in video server 1 and of the client machine are the same as the counterparts in the first preferred embodiment, and therefore detailed descriptions thereof will be omitted.

Figure 14:
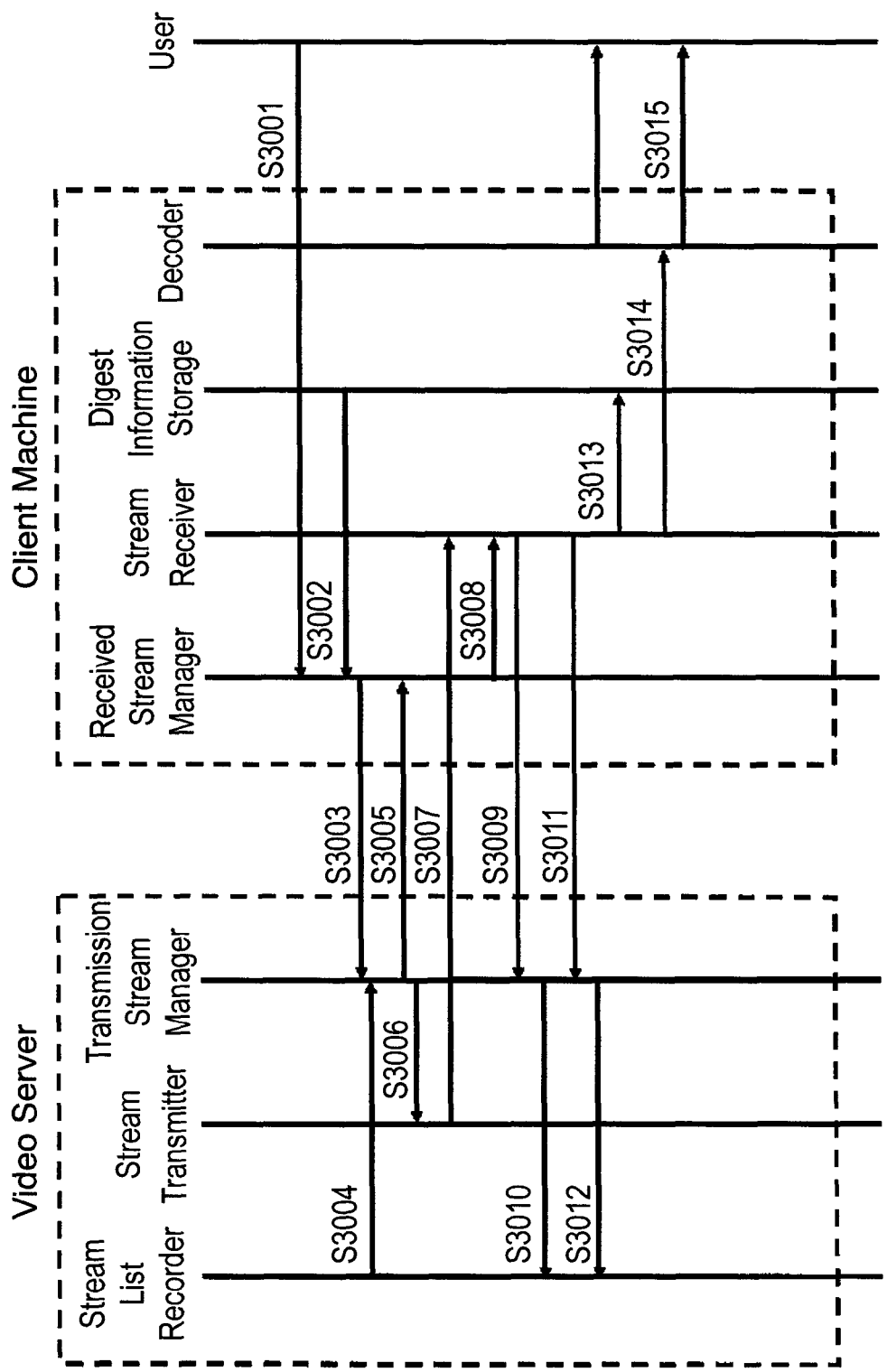
FIG. 14 is a timing chart explaining information exchange between the video server and a client machine according to the third preferred embodiment of the present invention.
Figure 15:
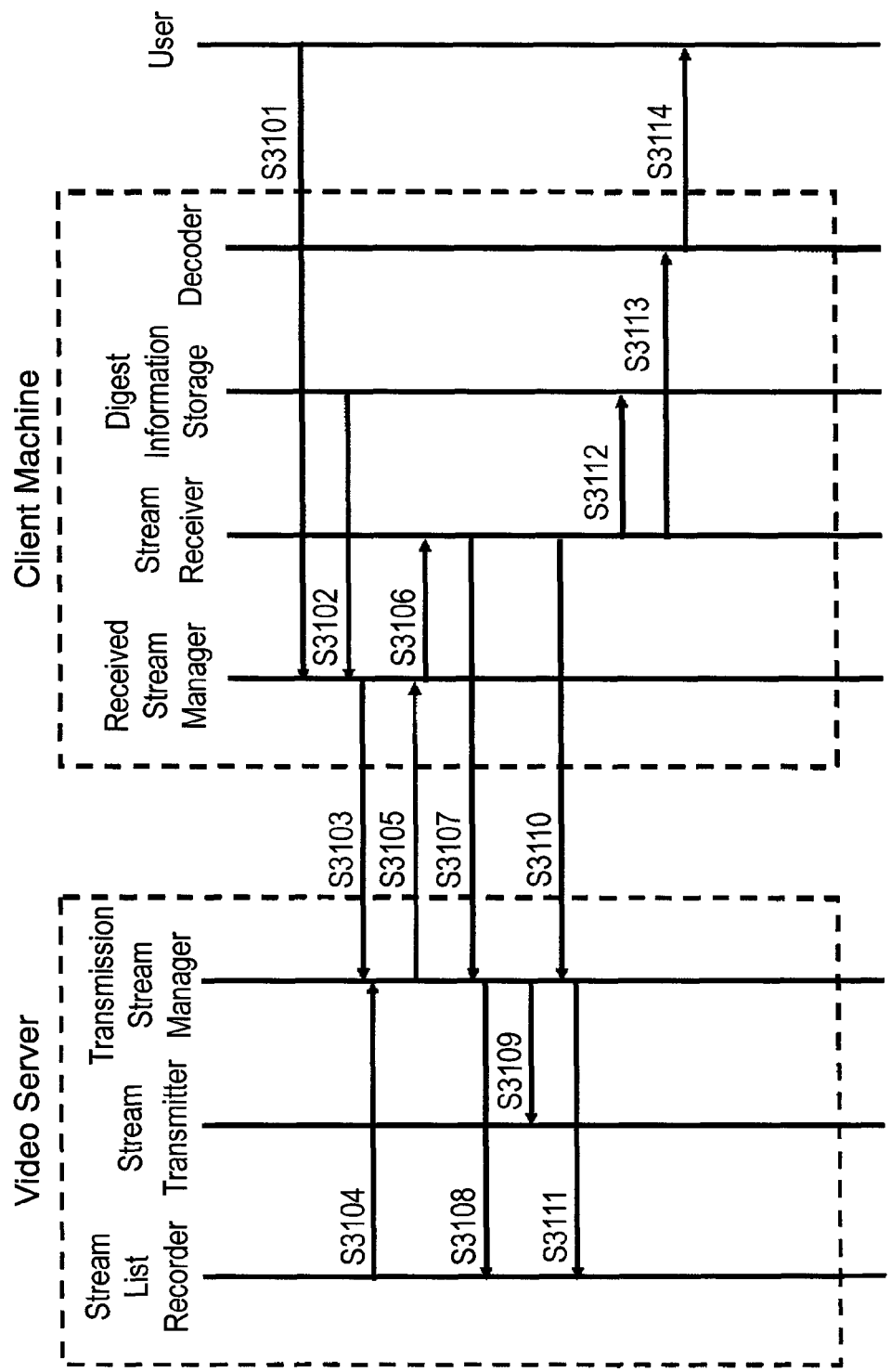
FIG. 15 is a timing chart explaining the information exchange between the video server and the client machine according to the third preferred embodiment of the present invention.

FIGS. 14 and 15 are timing charts explaining procedures of information exchange between video server 1 and client machines A 61 and B 62 according to the third preferred embodiment of the present invention.

The procedures until client machines A 61 and B 62 receive the digest stream from video server 1 are the same as those in the second preferred embodiment, and therefore, descriptions thereof will be omitted here.

Hereinafter, there will be described a sequence that, while client machines A 61 and B 62 are receiving the same digest stream, only a user of client machine A 61 who has been viewing the digest stream finds a digest just being on display not enjoyable, and operates a decision key on a remote control to request skip stream α.

First, as a user presses a "skip" key on a remote control attached to client machine A 61, received stream manager 31 in client machine A 61 detects an input event of the skip key via a remote control light sensor, which is not illustrated (step S3001). In consequence, received stream manager 31 acquires, from digest information recorder 34, a content ID included in a digest that is being received at the present (step S3002).

Next, received stream manager 31 in client machine A 61 sends a "skip stream information request" for requesting information on a skip stream that skips a predetermined number of digests forwardly to transmission stream manager 12 in video server 1 (step S3003). The "skip stream information request" here includes a content ID that received stream manager 31 has received from digest information recorder 34 at step S3002.

Transmission stream manager 12 in video server 1 acquires the content ID from the "skip stream information request", searches stream list 72, and selects a skip stream just transporting a content ID that identifies a video content next to a video content identified by the content ID (acquired from the "skip stream information request") (step S3004).

Transmission stream manager 12 sends a "skip stream information response" responding to the "skip stream information request" received from received stream manager 31 to received stream manager 31 in client machine A 61 (step S3005). The "skip stream information response" includes the multicast address and the port number of the selected skip stream and the skip stream rate. The skip stream rate may be omitted in the case that the newly transmitted skip stream and the previously transmitted digest stream or skip stream are the same in stream rate.

Transmission stream manager 12 in video server 1 notifies the content ID (i.e., a content ID of a digest next to the video content identified by the content ID acquired from the "skip stream information request"), the port number decided in advance and the selected multicast address to stream transmitter 17 (step S3006). Stream transmitter 17 transmits the skip stream to the notified multicast address at the notified rate (step S3007).

If there remains no corresponding skip stream recorded in stream list 72 at step S3004, transmission stream manager 12 instructs stream transmitter 17 to generate another skip stream (step S3006). Stream transmitter 17 generates a skip stream that starts from a digest of a video content next to the video content identified by the acquired content ID, and transmits the generated stream with an unused multicast address and a port number decided in advance attached thereto to the client machine (step S3007). Also in this case, transmission stream manager 12 notifies the new multicast address and the port number decided in advance to stream transmitter 17 (step S3006). Stream transmitter 17 transmits the skip stream to the notified multicast address and port number at the notified rate (step S3007).

Received stream manager 31 in client machine A 61 acquires the receiver multicast address and port number and the rate of the skip stream from the "skip stream information response" received from video server 1 at step S3004, and notifies the same to stream receiver 32 (step S3008). Stream receiver 32 sends a "stream reception discard notification" to transmission stream manager 12 in video server 1, because there is no need to receive the digest stream or the skip stream that has been received (step S3009).

Transmission stream manager 12 in video server 1 receives the "stream reception discard notification" sent by client machine A 61, acquires a content ID included in the notification, and decrements the receiver numbers of the corresponding stream in stream list 72 (step S3010). In the present situation, the receiver numbers of the digest stream is decremented from "2" to "1."

Stream receiver 32 in client machine A 61 sends a "stream reception notification" of the new skip stream to transmission stream manager 12 in video server 1 (step S3011). Transmission stream manager 12 acquires the receiver multicast address and the receiver port number from the "stream reception notification". Transmission stream manager 12 increments the receiver numbers of the corresponding stream in stream list 72 (step S3012). In the present situation, the receiver numbers of the skip stream α is incremented from "0" to "1."

Stream receiver 32 in client machine A 61 receives the skip stream indicating the notified multicast address, records content IDs of the digests included in the skip stream on a timely basis in digest information recorder 34 (step S3013), and passes the digest files included in the skip stream to decoder 33 (step S3014).

Decoder 33 in client machine A 61 decodes the digest files received from stream receiver 32, and sends the decoded files to the not-illustrated display in a TV set or the like to output audio and video (step S3015).

Next, there will be described a case that client machine B 62 also requests the skip stream α. In this case, received stream manager 31 in client machine B 62 detects an input event of the skip key via the not-illustrated remote control light sensor (step S3101). By detecting the input event, received stream manager 31 acquires, from digest information recorder 34, a content ID included in a digest that is being received at the present (step S3102).

Next, received stream manager 31 in client machine B 62 sends a "skip stream information request" to transmission stream manager 12 in video server 1 (step S3103). The "skip stream information request" here includes the content ID that has been received at step S3102.

Transmission stream manager 12 in video server 1 acquires the content ID from the "skip stream information request", searches stream list 72, and selects a skip stream just transporting a digest of a content next to a video content identified by the content ID acquired from the "skip stream information request" (step S3104).

Transmission stream manager 12 finds out the skip stream α and sends a "skip stream information response" to received stream manager 31 in client machine B 62 (step S3105). The "skip stream information response" includes the multicast address and the port number of the skip stream α and the skip stream rate.

Received stream manager 31 in client machine B 62 acquires the receiver multicast address and port number and the skip stream rate from the received "skip stream information response", and notifies the same to stream receiver 32 (step S3106).

In this configuration, client machine B 62 can receive the skip stream α that video server 1 has already been transmitting to client machine A 61. This reduces a load on the video server to generate a different digest stream for client machine B 62. The bandwidth load on the network connected to video server 1 is also reduced because the skip stream is delivered by multicast.

Stream receiver 32 in client machine B 62 sends a "stream reception discard notification" to transmission stream manager 12 in video server 1, because there is no need to receive the digest stream or the skip stream that has been received (step S3107).

Transmission stream manager 12 in video server 1 receives the "stream reception discard notification" sent by client machine B 62, acquires a content ID included in the notification, and decrements the receiver numbers of the corresponding stream in stream list 72 (step S3108). In the present situation, the receiver numbers of the digest stream is decremented from "1" to "0."

Transmission stream manager 12 in video server 1 notifies an instruction to stop the transmission of the digest stream to stream transmitter 17 (step S3109). Stream transmitter 17 stops transmitting the digest stream.

Transmission stream manager 12 in video server 1 determines that there exists no client that is receiving the digest stream and notifies an instruction to discard the digest stream to stream transmitter 17 at the timing when a counter in stream list 72 becomes "0." On receiving this instruction, stream transmitter 17 erases the digest stream from the memory inside thereof.

Stream receiver 32 in client machine B 62 sends a "stream reception notification" to transmission stream manager 12 in video server 1, when starting to receive the skip stream α (step S3110). Transmission stream manager 12 acquires the receiver multicast address and the receiver port number from the "stream reception notification". Transmission stream manager 12 increments the receiver numbers of the corresponding stream in stream list 72 (step S3111). In the present situation, the receiver numbers of the skip stream α is incremented from "1" to "2."

Stream receiver 32 in client machine B 62 receives the skip stream indicating the notified multicast address and port number, records content IDs of the digests included in the skip stream on a timely basis in digest information recorder 34

(step S3112), and passes the digest files included in the skip stream to decoder 33 (step S3113).

Decoder 33 in client machine B 62 decodes the digest files received from stream receiver 32, and sends the decoded files to the not-illustrated display in a TV set or the like to output audio and video (step S3114).

The video delivery system according to the third preferred embodiment has been described as an example and is not restricted to such an example.

For example, RTSP may be applied to the "digest information request", the "digest information response", the "body playback request", the "body playback response", the "skip stream information request" and the "skip stream information response" as well as in the first preferred embodiment. In this configuration, the same protocol may be applied to the "digest information request" and the "digest information response", and the "skip stream information request" and the "skip stream information response".

In addition, the "stream reception notification" and the "stream reception discard notification" can be replaced with the "join" and "leave" methods of IGMP, like in the second preferred embodiment.

It should be noted that although the third preferred embodiment has been described in an exemplary situation that client machines A 61 and B 62 request the skip stream, the present invention is also applicable, in the same manner, to another situation that the client machines request the reverse stream.

Further, the third preferred embodiment has been described on the assumption that the skip stream and the reverse stream are such streams that skip one digest forwardly and backwardly, respectively. The skip or reverse stream may, however, skip any number of digests instead.

Fourth Preferred Embodiment

A fourth preferred embodiment will be described on the assumption that: while a user of a client machine that is receiving a skip stream is viewing the skip stream, the skip stream is unified into a digest stream after a certain period, and a server erases the skip stream.

In the fourth preferred embodiment, a digest stream and a skip stream are adjusted to differ from each other in a transport period of each digest of contents included therein, so that the two streams coincide with each other in the timing of the digests changing from one to another after a certain period.

Figure 16:
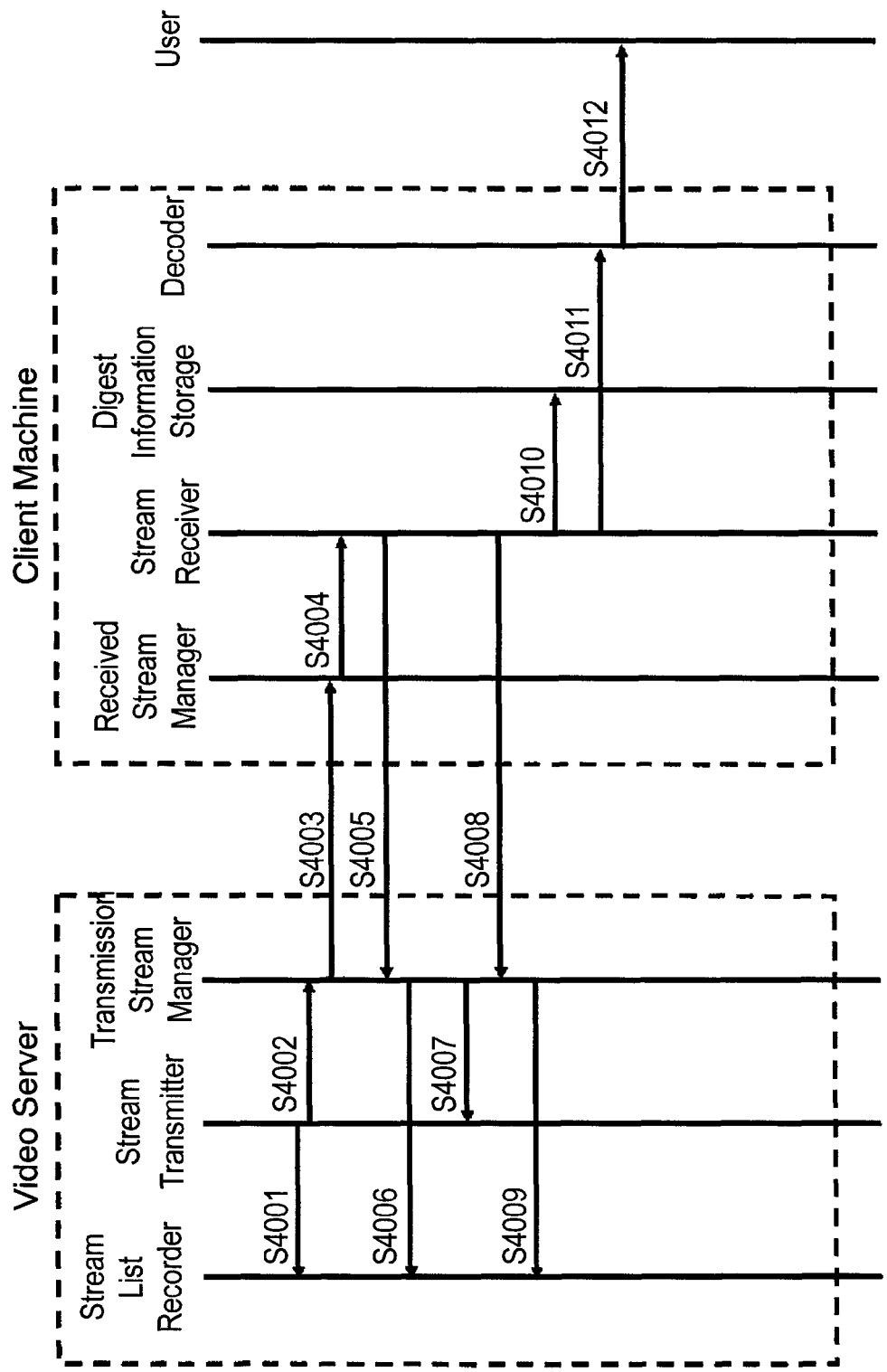
FIG. 16 is a timing chart explaining information exchange between a video server and a client machine according to a fourth preferred embodiment of the present invention.

The fourth preferred embodiment will be described on the premise of the video delivery system utilizing the video server and the client machine described in the third preferred embodiment. Hereinafter, a sequence that a skip stream is unified into a digest stream while client machine A 61 is receiving the digest stream and client machine B 62 is receiving the skip stream α will be described with reference to FIG. 16.

Stream transmitter 17 in video server 1 is renewing the content ID recorded in stream list 72 one after another in synchronization with the change of the digests of the contents included in the skip stream (step S4001). Stream transmitter 17 always monitors renewal of the content IDs in stream list 72 to find out the timing that content IDs of the digest stream and the skip stream are renewed simultaneously to the same content ID. On finding out the simultaneous renewal to the same ID in stream list 72, stream transmitter 17 notifies the finding to transmission stream manager 12 (step S4002). Hereinafter, stream transmitter 17 will be supposed to have found out the simultaneous renewal to the same ID between the digest stream and the skip stream α.

On finding out the simultaneous renewal to the same ID between the digest stream and the skip stream α, transmission stream manager 12 in video server 1 sends a "stream switch-over notification" to received stream manager 31 in client machine B 62 that is receiving the skip stream α (step S4003). The "stream switch-over notification" includes a receiver multicast address and a receiver port number of the digest stream into which the skip stream is to be unified, and a stream rate.

Received stream manager 31 in client machine B 62 instructs stream receiver 32 to change its received stream to another one having the receiver multicast address, the receiver port number and the stream rate that are indicated in the "stream switch-over notification" (step S4004).

As a result, client machine B 62 is switched so as to receive the digest stream instead of the skip stream α at the moment that the received digest of content included in the skip stream α shifts to the next one. This configuration implements the unification of client machines into the same digest stream without rendering the user an uncomfortable feeling, and reduces the number of skip streams that the video server has to store in its memory. Thus, this configuration reduces the number of the skip streams while satisfying user's requests, and thereby, also reduces the bandwidth load on the network connected to the video server.

Next, stream receiver 32 in client machine B 62 that has completed the switch-over from the skip stream α, which has been being received, to the digest stream sends a "stream discard notification" regarding the skip stream α to transmission stream manager 12 in video server 1 (step S4005). On receiving this notification, transmission stream manager 12 decrements the receiver numbers of the corresponding stream (i.e., skip stream α) in stream list 72 (step S4006). In the fourth preferred embodiment, the receiver numbers of the digest stream is decremented from "1" to "0."

On receiving the "stream discard notification" from client machine B 62, transmission stream manager 12 in video server 1 instructs the stream transmitter to stop transmitting the skip stream α (step S4007). In consequence, the stream transmitter in the video server stops transmitting the skip stream α.

Further, transmission stream manager 12 in video server 1 determines that there exists no client that is receiving the skip stream α and notifies an instruction to discard the skip stream α to stream transmitter 17 at the timing when the receiver numbers becomes "0" as a result of renewal of stream list 72. On receiving this instruction, stream transmitter 17 erases the skip stream from a memory inside thereof.

Stream receiver 32 in client machine B 62 sends a "stream reception notification" of the unified digest stream to transmission stream manager 12 in video server 1 (step S4008). Transmission stream manager 12 acquires the receiver multicast address and the receiver port number from the "stream reception notification", and increments the receiver numbers of the corresponding stream (i.e., the digest stream) in stream list 72 (step S4009). In the fourth preferred embodiment, a counter in stream list 72 for counting the receiver numbers is incremented from "1" to "2" because client machine A 61 is receiving the digest stream.

Stream receiver 32 in client machine B 62 receives the digest stream indicating the notified multicast address and port number, records content IDs of the digests included in the digest stream on a timely basis in digest information recorder 34 (step S4010), and passes the digest files included in the digest stream to decoder 33 (step S4011).

Decoder 33 in client machine B 62 decodes the digest files received from stream receiver 32, and sends the decoded files to the not-illustrated display in a TV set or the like to output audio and video (step S4012).

Hereinafter, there will be described an exemplary structure of the digest stream and the skip stream α generated by the video server with reference to FIG. 17.

Figure 17:
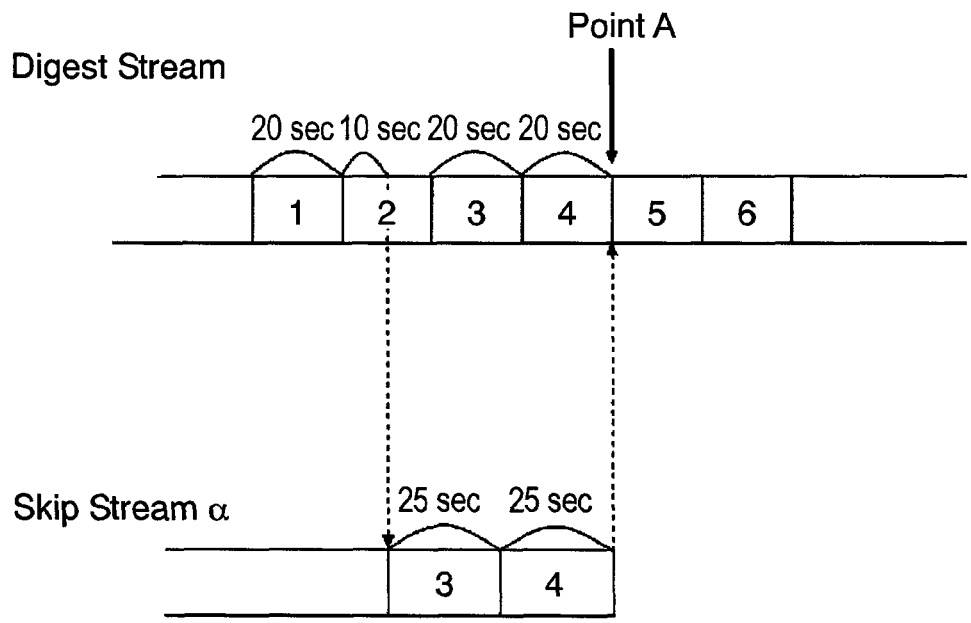
FIG. 17 is a diagram showing structures of streams according to the fourth preferred embodiment of the present invention.

As FIG. 17 shows, the skip stream α carries digests that differ in length from those of contents carried by the digest stream. This structure allows the two streams to start to transport the digests of the same content simultaneously at a certain time (i.e., at point A).

As FIG. 17 shows, suppose that a user, while viewing the digest stream that carries digests of contents each being 20 seconds in length, presses a skip button on a remote control to skip a content to the next one in the midst of viewing the second content included in the digest stream, e.g., 10 seconds after the digest of the second content starts. Then video server 1 generates the skip stream α, which carries digests of contents each being 25 seconds in length. In consequence, the fifth digest starts at the same time (i.e., at point A) between the digest stream and the skip stream, and therefore, the viewer of the skip stream α can be changed to be a viewer of the digest stream, and the skip stream α can be erased.

Figure 18:
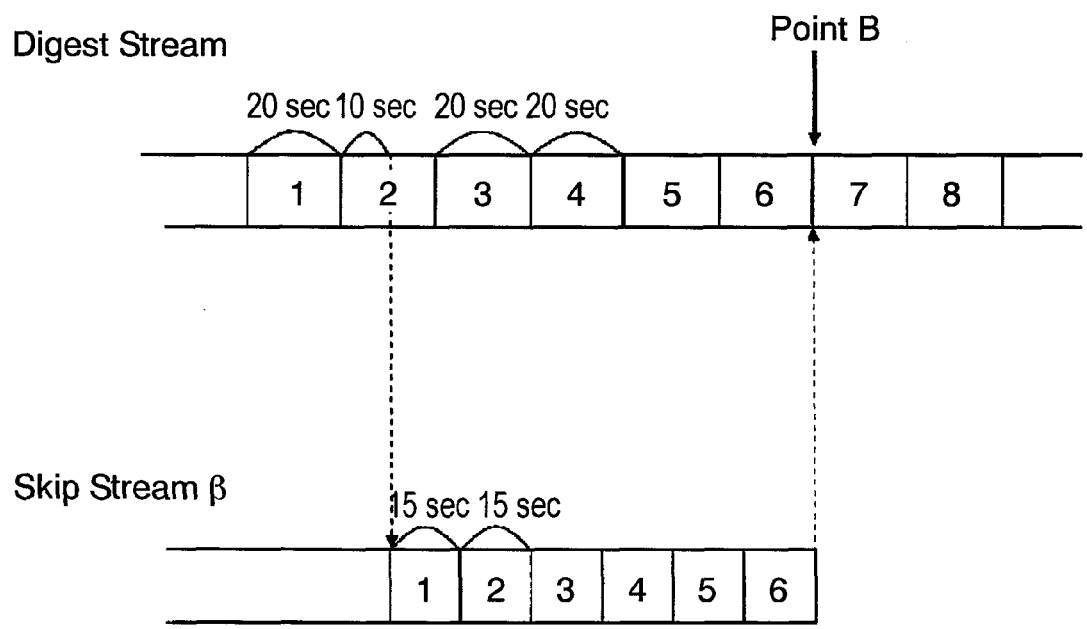
FIG. 18 is a diagram showing the structures of the streams according to the fourth preferred embodiment of the present invention.

FIG. 18 is a diagram showing an exemplary structure of the digest stream and a reverse stream β in the case that these streams are unified.

Like the skip stream α unified into the digest stream, reverse stream β carries digests that differ in length from those of contents carried by the digest stream.

As FIG. 18 shows, suppose that a user, while viewing the digest stream that carries digests of contents each being 20 seconds in length, presses a reverse button on a remote control to reverse a content to the last one in the midst of viewing the second content included in the digest stream, e.g., 10 seconds after the digest of the second content starts. Then video server 1 generates the reverse stream β, which carries digests of contents each being 15 seconds in length. In consequence, the seventh digest starts at the same time (i.e., at point B) between the digest stream and the reverse stream β, and therefore, the viewer of the reverse stream β can be changed to be a viewer of the digest stream, and the reverse stream β can be erased.

The fourth preferred embodiment has been described on the assumption that client machine B 62 has been receiving the skip stream α, whereas the present invention is also applicable to the case that client machine B 62 has been receiving the reverse stream p.

Further, there has been described such an example that the skip stream or the reverse stream is generated at any time when a user requests. However, the skip stream or the reverse stream may be generated after the digest stream has transported its digests for a predetermined period, such as 5, 10 or 15 seconds. This configuration allows the skip stream or the reverse stream to easily coincide with the digest stream in the starting time of the digests of the same contents.

Further more, there has been shown such a stream structure that each digest is 20 seconds length in the digest stream, 25 seconds in the skip stream and 15 seconds in the reverse stream. However, this structure is only an example and is not restricted hereto. Any length is applicable to the periods as far as appropriate for a user to view the digests. In addition, the length of the digests may be variable as far as the coincidence is secured in the starting time of digests between the streams a certain number of digests later.

It can freely be determined in the video server how many digests later the coincidence in the starting time of digests is secured.

The fourth preferred embodiment has been described focusing on the unification of the digest stream, the skip stream and the reverse stream, whereas the embodiment is not restricted to such an example. Any pair of streams that each carry digests, such as a pair of skip streams, a pair of reverse streams, and a pair of a skip stream and a reverse stream can be unified. For example, when there comes to exist no user that is viewing a digest, the digest stream may be erased and unified into a skip stream.

In the fourth preferred embodiment, stream receiver 32 in client machine B 62 sent the "stream discard notification" regarding the skip stream α to transmission stream manager 12 (step S4005). This procedure may however be omitted, and instead, transmission stream manager 12 in video server 1 may decrement the receiver numbers of the corresponding stream (i.e., the skip stream) in stream list 72, utilizing the "stream switch-over notification" sent from transmission stream manager 12 in video server 1 to received stream manager 31 in client machine B 62 at step S4003. This configuration advantageously reduces procedures between the video server and the client machines.

Fifth Preferred Embodiment

A fifth preferred embodiment will be described on an example that a client machine has a storage. In this example, the client machine stores part of the digest stream, in the storage, that has not yet been received while receiving the digest stream (on the assumption that a video server is transmitting another digest stream for storage by multicast), and thereby, the client machine itself generates a skip stream in response to a user request for a skip. The client machine further stores part of the skip stream that has not yet been received to prepare for another skip request while receiving the skip stream. The client machine receives the next part from the server after having provided all the stored part for the user's view.

Figure 19:
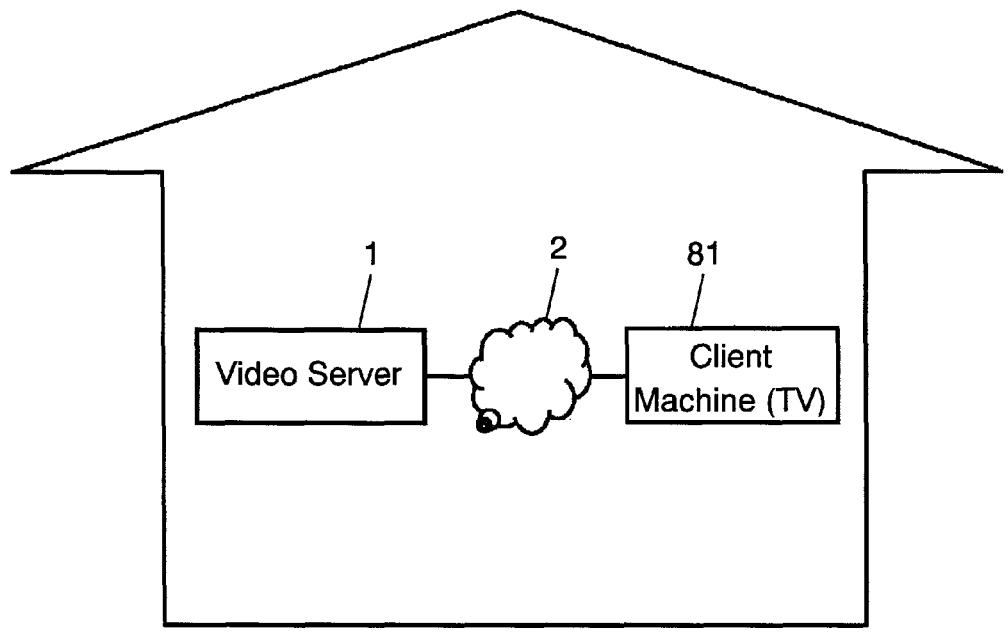
FIG. 19 is a diagram schematically showing a video delivery system according to a fifth preferred embodiment of the present invention.

FIG. 19 is a diagram schematically showing a video delivery system utilizing a video server and a client machine according to the present invention.

In FIG. 19, video server 1 and client machine 81 are connected to each other via wired/wireless network 2. The structure of video server 1 is the same as those described in the first to fourth preferred embodiments, and therefore, will not be described here again.

Figure 20:
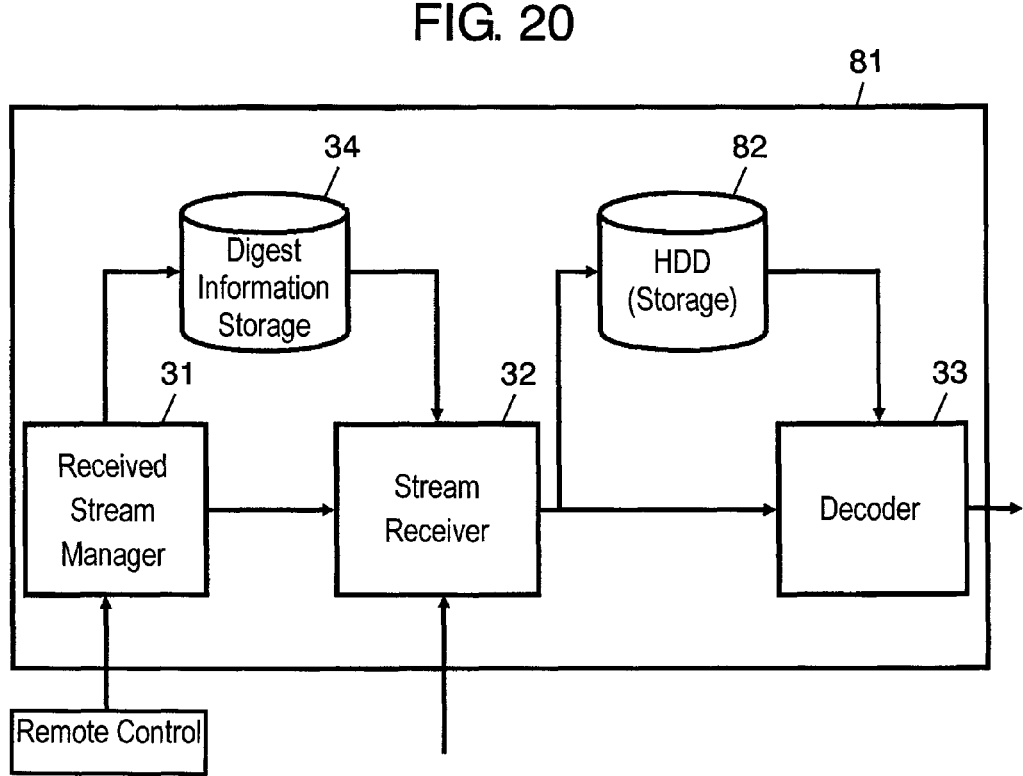
FIG. 20 is a diagram showing an internal structure of a client machine according to the fifth preferred embodiment of the present invention.

FIG. 20 is a diagram showing a structure of client machine 81 according to the fifth preferred embodiment.

In FIG. 20, HDD 82 stores the digest stream received from video server 1 inside thereof.

Figure 21:
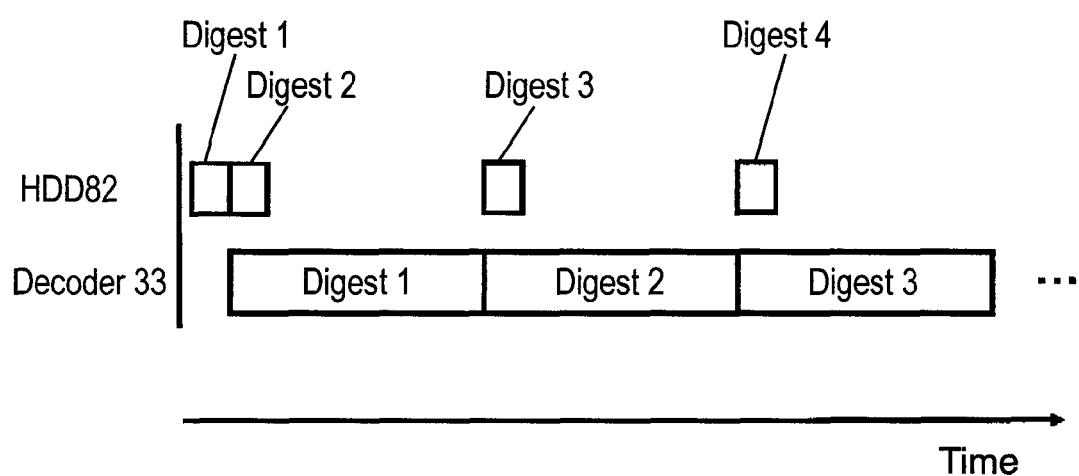
FIG. 21 is a diagram showing a method of receiving a digest stream according to the fifth preferred embodiment of the present invention.

In the fifth preferred embodiment, as FIG. 21 shows, the digest stream is received from video server 1 at high rate and stored in HDD 82. The digests stored in HDD 82 are sequentially transferred to decoder 33 so that the digest stream is played back. For example, HDD 82 acquires 15 seconds length of digest 1 at high rate in 3 seconds, and stores it therein. Digest 1 is, thereafter, transferred from HDD 82 to decoder 33. HDD 82 acquires digest 2 at high rate and stores it therein while digest 1 is being played back.

Figure 22:
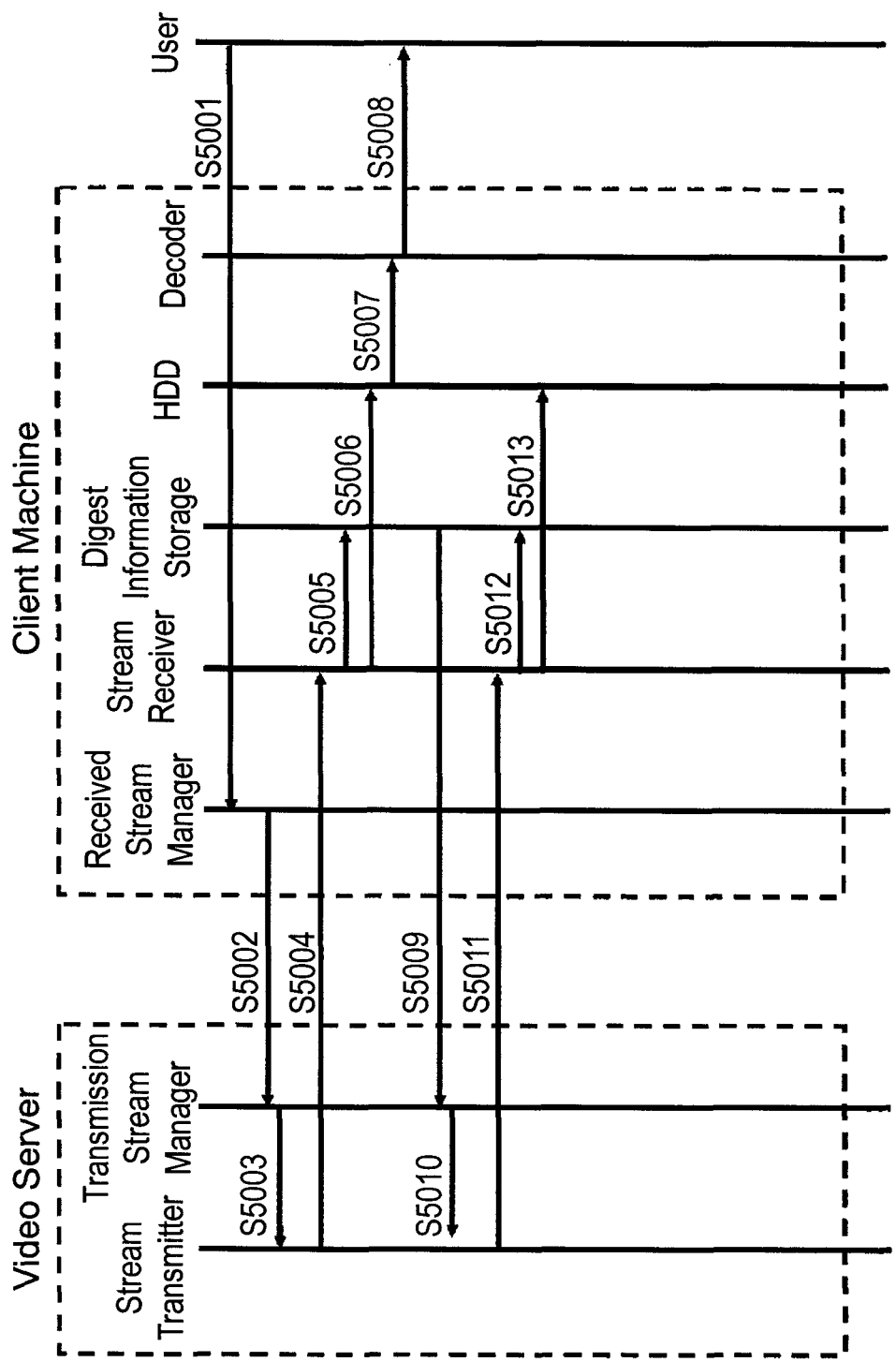
FIG. 22 is a timing chart explaining information exchange between a video server and the client machine according to the fifth preferred embodiment of the present invention.

FIG. 22 is a timing chart explaining procedures of information exchange between video server 1 and client machine 81 according to the fifth preferred embodiment.

Hereinafter, there will be described a sequence that, while a user of client machine 81 is viewing a digest stream, the user finds a digest not enjoyable, and operates a skip key on a remote control to request a skip stream.

First, as a user presses a "digest" key on a remote control attached to client machine 81, received stream manager 31 in client machine 81 detects an input event of the digest key via a remote control light sensor, which is not illustrated (step S5001).

In consequence, received stream manager 31 in the client machine sends a "digest acquisition request" to transmission stream manager 12 in video server 1 (step S5002). The "digest acquisition request" here includes an IP address of client machine 81 and a port number of client machine 81 for receiving the digest stream.

Transmission stream manager 12 in video server 1 notifies the IP address and the port number of client machine 81 (acquired from the "digest acquisition request") to stream transmitter 17 (step S5003). Stream transmitter 17 in video server 1 generates the digest stream of content 1, and transmits the same to the notified IP address and port number of client machine 81 (step S5004). The digest stream of content 1 is transmitted to client machine 81 at higher rate than a normal playback rate.

Stream receiver 32 in client machine 81 receives the digest stream indicating the notified IP address and port number, records a content ID included in the digest stream in digest information recorder 34 on a timely basis (step S5005), and passes a digest file of content 1 included in the digest stream to HDD 82 (step S5006). HDD 82 stores the received digest file of content 1 therein together with its content ID.

HDD 82 supplies the stored digest file of content 1 to decoder 33 (step S5007). Decoder 33 decodes the supplied digest file of content 1, and sends the decoded file to a not-illustrated display in a TV set or the like to output audio and video (step S5008).

Digest information recorder 34 sends a "next digest acquisition request" for another digest following the digest of content 1 stored in HDD 82 (i.e., the digest of content 2) to transmission stream manager 12 in video server 1 (step S5009).

Transmission stream manager 12 in video server 1 notifies the IP address and the port number of client machine 81 (acquired from the "next digest acquisition request") to stream transmitter 17 (step S5010). Stream transmitter 17 in video server 1 transmits the digest stream of content 2 to the notified IP address and port number (step S5011). The digest stream of content 2 is also transmitted to client machine 81 at higher rate than a normal playback rate.

Stream receiver 32 in client machine 81 receives the digest stream indicating the notified IP address and port number, records a content ID included in the digest stream in digest information recorder 34 on a timely basis (step S5012), and stores the received digest file of content 2 to HDD 82 together with its content ID (step S5013).

This configuration obtains a file of the digest of content 2 from video server 1 and stores the same in HDD 82 in advance, preparing for a user request for a skip whilst client machine 81 is receiving the digest of content 1 for its user's view. Thus, the user request for a skip is processed by client machine 81. The configuration, therefore, reduces a load on video server 1 and a bandwidth load on a communication line connected to video server 1, and further, implements a skip process promptly responding to a user request.

Description has been given here on an example that a digest just after the digest of content 1 stored in HDD 82 (i.e., the digest of content 2) is obtained from video server 1, whereas a digest just before the digest of content 1 stored in HDD 82 (e.g., digest 20 if all 20 digests are looped) may also be obtained. This configuration allows the system to deal with a request for a reverse from a user of client machine 81. Storing a predetermined number of digests that have already been viewed in HDD 82 to prepare for a user request for a reverse, the system enables client machine 81 itself to process the user request for a reverse of digests within that number. For example, when a user who has been viewing the digests from digest 1 in sequence requests a reverse to review digest 5 in the midst of viewing the digest 10, the system that has stored digests 1 to 10 in HDD 82 can play back digest 5 read from HDD 82.

In the fifth preferred embodiment, the digest stream can be transmitted by any of unicast, broadcast and multicast.

One can freely set the number of digests that are stored in HDD 82 in advance. For example, the system can erase digests that are never to be read out directly in response to a predetermined number of skip or reverse requests. This configuration advantageously reduces a memory capacity of HDD 82 in client machine 81, immediately resulting in reduction in a unit cost of client machine 81.

Sixth Preferred Embodiment

A sixth preferred embodiment will be described on an example that a video server is transmitting a certain number of digest streams 1 to n to a multicast address. In this example, when a user of a client machine that is receiving a digest stream sends a skip request, the video server notifies a multicast address of another digest stream to the client machine. The digest streams 1 to n are provided with a pausing period rotating between them.

Figure 23:
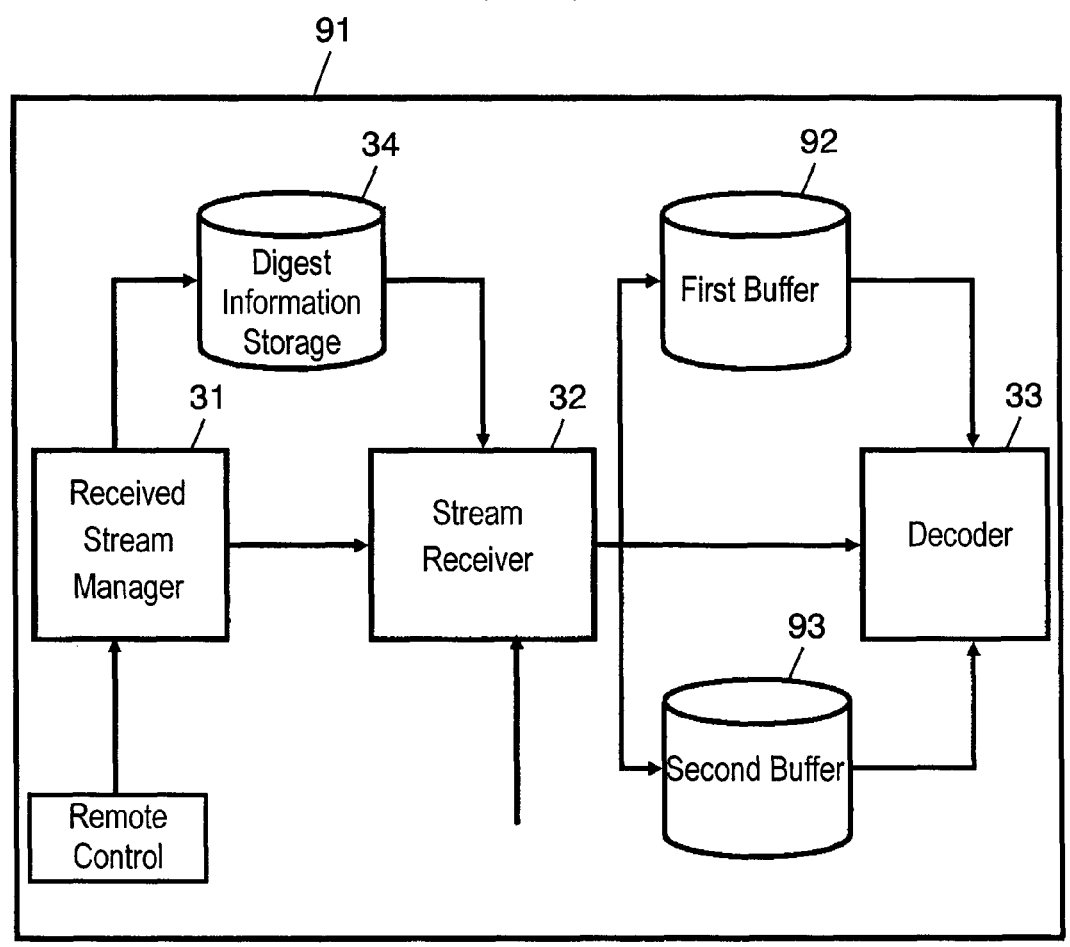
FIG. 23 is a diagram showing a structure of a client machine according to a sixth preferred embodiment of the present invention.

FIG. 23 is a diagram showing a structure of client machine 91 according to the sixth preferred embodiment. In FIG. 23, client machine 91 includes first buffer 92 and second buffer 93 for temporarily storing the digest stream received from video server 1. Other structures are the same as those described in the fifth preferred embodiment, and therefore, will not be described here again.

The structure of video server 1 according to the sixth preferred embodiment is also the same as that described in the first to fifth preferred embodiments, and therefore, will not be described here again.

A switch-over between plural digest streams will also not be described here because it is the same in process as a switch-over between the digest stream and the skip stream described in the first to fifth preferred embodiments.

The sixth preferred embodiment provides a digest stream with a characteristic structure, thereby reducing a bandwidth load on a communication line connected to the video server.

Figure 24:
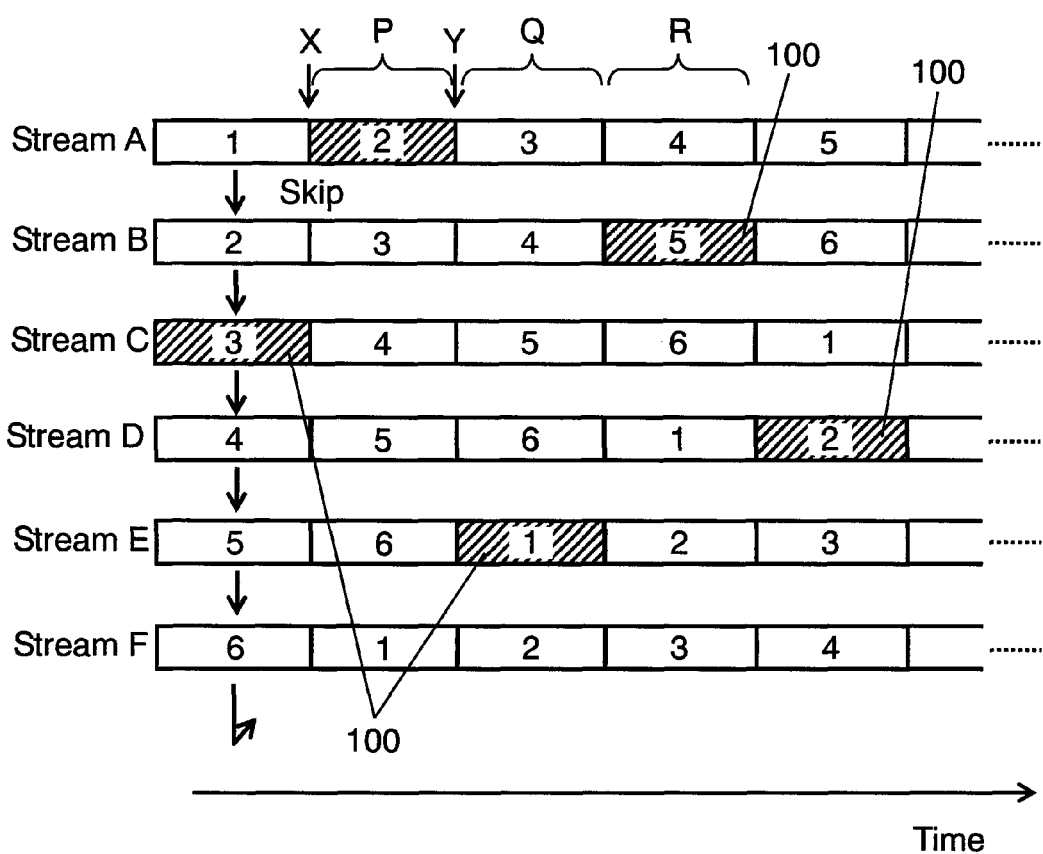
FIG. 24 is a diagram showing structures of streams according to the sixth preferred embodiment of the present invention.

FIG. 24 is a diagram showing an example of structures of plural digest streams held in the video server. In FIG. 24, the video server, holding 6 contents, i.e., contents 1 to 6, cuts out a predetermined time length of digest from each of the contents, and combines the digests sequentially so as to produce digest streams as digest streams A to F. The digest streams A to F are set to have digests 1 to 6 at their head, respectively so that a user who skips digests to move between the digest streams never views another digest of the same content. The digest streams are provided with pausing period 100, which rotates between them. Each digest stops being transmitted during its pausing period 100. If a user, viewing a digest stream, requests a skip whilst the digest stream is in its pausing period 100, this digest stream is replaced with next one.

In the sixth preferred embodiment, the order of switch-over of the digest streams responsive to a user request has been regularized in a forward direction in advance. The digests are switched over in the order of A, B, C and so on, for example.

Stream transmitter 17 in video server 1 generates the digest streams on the basis of a predetermined rule or a free setting by an administrator of video server 1.

The switch-over of the digest streams in the order shown in FIG. 24 requires some adjustment in relation to pausing period 100. A user who is skipping digests to move between the digest streams by requesting skips can skip a digest stream that is in its pausing period 100 if any. However, a user who is viewing one digest stream continuously will be unpleasant when a digest of a content is not displayed over the pausing period. This problem can be solved by a buffer provided as follows.

With reference to FIG. 24, transmission stream manager 12 in video server 1 notifies which program of which digest stream is to pause one digest after (e.g., period Q in FIG. 24) to received stream manager 31 in client machine 91 at a turn of digests included in the digest stream (i.e., time X in FIG. 24). For example, it is notified to client machine 91 at time X in FIG. 24 that digest 1 in digest stream E is to pause during period Q. Likewise, it is notified to client machine 91 at time Y in FIG. 24 that digest 5 in digest stream B is to pause during period R.

When client machine 91 is receiving digest stream E for its user's view, for example, received stream manager 31 notified of a pause of digest 1 in digest stream E during period Q instructs stream receiver 32 to receive digest 1 for digest stream E in period Q from another digest stream and store the same in first buffer 92 in advance. On receiving the instruction, stream receiver 32 receives the broadcast of digest 1 for digest stream F in period P received from video server 1 stores the same in first buffer 92. Received stream manager 31, on the basis of a rule predetermined by stream transmitter 17 in video server 1, foresees that digest 1 required by client machine 91 is to be transported by digest stream F during period P.

Received stream manager 31 in client machine 91, which is receiving digest stream E for its user's view, instructs stream receiver 32 to acquire digest 1 from first buffer 92 in period Q and to decode the same. Stream receiver 32, on receiving the instruction, receives digest 1 from first buffer 92 and decodes the same to output it onto a display.

Description has been given on an example that a digest data required to playback the digest corresponding to pausing period 100 of digest stream E is received from another digest stream and stored in advance. Client machine 91, however, may receive and store digests corresponding to the pausing periods of other respective digest streams in advance, preparing for its user to desire to view other digest streams.

In the above-mentioned example, first digest 1 is stored in first buffer 92 until being played back during period Q, and therefore, digest 5, which is to pause in digest stream B during period R, may be received from skip stream C and stored in second buffer 93 during period Q.

Thus, with the structure that the pausing period rotates between the digest streams, the sixth preferred embodiment reduces the bandwidth load on a communication line connected to the video server. Therefore, although six digest streams A to F are transmitted by multicast in the sixth preferred embodiment, the bandwidth capability is required only for five digest streams due to the pausing periods provided.

As regards the rotation of the pausing period, the timing and number of rotations are freely given, whereas at least one of the digest streams has to pause at any period of transmitting digests.

Description has been given on the video server and video delivery system in accordance with the present invention in the first to sixth preferred embodiments; however, the present invention is also implemented by use of a device having an operational function, such as a personal computer (PC). In this case, a program that implements the above-mentioned invention may be installed in the device as software so that a CPU (Central Processing Unit) in the device executes the program.

Further, programs or data equivalent to programs for implementing the processes according to the preferred embodiments 1 to 4, capable of being executed by a CPU, may be stored in storage media, such as CD-ROMs so that the processes are implemented by the CPU provided in the device, such as a PC provided with a data reader.

INDUSTRIAL APPLICABILITY

The video server and video delivery system using the same according to the present invention allows a user to easily select one from video contents stored in the storage and prevents the user from a false selection, and therefore, they are useful.

The invention claimed is:

1. A video server comprising:
  a contents storage for storing video contents comprising a plurality of programs, each one of the plurality of programs having a respective content ID; and
  a stream transmitter for generating and transmitting a digest stream that is a single stream into which a plurality of digests are combined, each of said digests having a predetermined time length, cut out from a respective different one of the plurality of programs stored in the contents storage, wherein
  each one of the plurality of digests includes one or more parts cut from a corresponding one of the plurality of programs; and
  each one of the digests is associated with the content ID of the corresponding one of the programs from which the respective one of the digests is cut, wherein
  the stream transmitter is operable to transmit a plurality of the digest streams such that each one of the plurality of the digest streams includes the digests in a different order than other ones of the plurality of the digest streams, and wherein
  a pausing period is provided in the digest streams respectively such that a rotation of the pausing period is performed among the digest streams.

2. The video server in accordance with claim 1, further comprising a transmission stream manager for instructing the stream transmitter to transmit the digest stream on receiving a request for the digest stream from a client machine, wherein the stream transmitter generates the digest stream on receiving the instruction from the transmission stream manager and transmits the same to the client machine.

3. The video server in accordance with claim 2, wherein the transmission stream manager, on receiving a request for a play back of a program stream corresponding to a digest included in the digest stream from the client machine which is receiving the digest stream, instructs the stream transmitter to transmit the program stream, and the stream transmitter transmits the program stream to the client machine on receiving the instruction from the transmission stream manager.

4. The video server in accordance with claim 2, wherein the transmission stream manager, on receiving a request for a skip or a reverse of a digest from the client machine, instructs the stream transmitter to transmit a skip stream or a reverse stream, and the stream transmitter, on receiving the instruction from the transmission stream manager, generates a skip stream that is a predetermined number of the digests ahead or a reverse stream that is a predetermined number of the digests behind, and transmits the same to the client machine.

5. The video server in accordance with claim 2, wherein the transmission stream manager, on receiving a request for a play back of a program stream corresponding to a digest included in a digest stream, a skip stream or a reverse stream from the client machine, instructs the stream transmitter to transmit the program stream, and the stream transmitter transmits the program stream to the client machine on receiving the instruction from the transmission stream manager.

6. The video server in accordance with claim 2, wherein the transmission stream manager, on receiving a request for a skip or a reverse of the digests from the client machine, instructs a transmission of the skip stream or the reverse stream that is being transmitted if existing, or a transmission of a new skip stream or a new reverse stream if not exists, and the stream transmitter, on a basis of the instruction from the transmission stream manager, transmits a skip stream that is a predetermined number of the digests ahead or a reverse stream that is a predetermined number of the digests behind to the client machine if there is being transmitted the skip stream or the reverse stream, or alternatively generates a skip stream that is a predetermined number of the digests ahead or a reverse stream that is a predetermined number of the digests behind to transmit the generated skip or reverse stream to the client machine if there is not being transmitted the skip stream or the reverse stream.

7. The video server in accordance with claim 2, wherein the transmission stream manager, at a time when one stream and another stream among a plurality of skip streams or reverse streams being transmitted coincide with each other in a starting time of transporting a digest included therein, instructs the stream transmitter to replace the another stream with the one stream for a client machine whose user is viewing the another stream and to discard the another stream, and the stream transmitter, on a basis of the instruction from the transmission stream manager, erases the another stream, which is one to be discarded among the plurality of skip streams or reverse streams, from a memory included inside thereof, and transmits the one stream, into which the another stream is to be unified, to the client machine.

8. The video server in accordance with claim 7, wherein the plurality of skip streams or reverse streams transmitted by the stream transmitter differ from each other in a transport period of each of the digests included therein, and at least two of the plurality of skip streams or reverse streams coincide with each other in a starting time of transporting a digest included therein to be transported after a certain number of digests being transported.

9. The video server in accordance with claim 2, wherein the stream transmitter, on receiving a request for a digest stream or a skip or a reverse of a digest from the client machine, instructs the stream transmitter to transmit a digest stream, a skip stream or a reverse stream, the stream transmitter, on a basis of the instruction from the transmission stream manager, selects a stream from the plurality of the digest steams being transmitted and transmits the selected stream to the client machine, the plurality of the digest streams being transmitted by the stream transmitter synchronize with each other in such a manner that the digests included in the plurality of the digest streams start to be transported at a same time, and each of the plurality of the digest streams being transmitted has a predetermined number of pausing periods every predetermined number of digests, and the plurality of the digest streams being transmitted include a predetermined number of pausing periods at a same transmission time and do not include the pausing periods that appear in a switched order of the plurality of digest streams in accordance with a skip or reverse instruction.

10. The video server in accordance with claim 1, wherein the digest stream is transmitted to a multicast address.

11. A video delivery system comprising a video server and a client machine, wherein the video server includes:
 a contents storage for storing video contents including a plurality of programs, each one of the plurality of programs having a respective content ID;
 a transmission stream manager for instructing a transmission of a digest stream on receiving a request for a digest stream from the client machine; and
 a stream transmitter for generating the digest stream on receiving the instruction from the transmission stream manager and transmitting the same to the client machine; and wherein the client machine includes:
 a stream receiver for receiving the digest stream from the video server;
 a decoder for decoding and outputting the received digest stream; and
 a received stream manager for sending a request for transmission of a digest stream to the transmission stream manager of the video server on receiving a request for a digest stream from a user,
 wherein said digest stream is a single stream comprised of a compilation of individual digests each from a respective different one of said plurality of programs, each of said individual digests having a predetermined time length, wherein each one of the individual digests includes one or more parts cut from the respective one of the plurality of programs; and
 each one of the individual digests is associated with the content ID of the respective one of the programs from which the one of the individual digests is cut, and wherein the stream transmitter is operable to transmit a plurality of the direst streams such that each one of the plurality of the direst streams includes the digests in a different order than other ones of the plurality of the digest streams, and further wherein a pausing period is provided in the direst streams respectively such that a rotation of the pausing period is performed among the direst streams.

12. The video delivery system in accordance with claim 11, wherein
 the transmission stream manager receives a request for the digest stream or for a play back of a program stream corresponding to a digest included in the digest stream from the client machine, instructs the stream transmitter to transmit the digest stream on receiving a request for the digest stream, and extracts the content ID of the digest included in the digest stream that identifies the program stream from the request for a play back of the program stream on receiving a request for a play back of the program stream to instruct the stream transmitter to transmit a program stream corresponding to the extracted content ID,
 the stream transmitter, on receiving the instruction to transmit the digest stream from the transmission stream manager, generates and transmits a digest stream that is a single stream into which said individual digests cut out from the respective programs stored in the contents storage and the corresponding content IDs are combined so as to relate to each other, and, on receiving the instruction to transmit a program stream from the transmission stream manager, transmits a program stream corresponding to the content ID to the client machine,
 the client machine further includes a digest information recorder for extracting the content IDs from the digest stream that are being received by the stream receiver and recording the same one after another, and the received stream manager, on receiving a request for a play back of a program stream from a user, instructs the transmission stream manager to play back a program stream corresponding to the content ID acquired from the digest information recorder.

13. The video delivery system in accordance with claim 11, wherein the video server further includes a receiver numbers recorder for counting a number of receivers of the digest stream on receiving a request for transmission or discard of the digest stream from the transmission stream manager, the stream transmitter generates and transmits the digest stream on receiving the instruction from the transmission stream manager, and erases the digest stream from a memory included inside thereof when a count of the receiver numbers recorder becomes zero, and the received stream manager sends a request for transmission of the digest stream to the transmission stream manager on receiving a request for the digest stream from a user, and sends a request for discard of the digest stream to the transmission stream manager when receiving the digest stream is to be stopped.

14. The video delivery system in accordance with claim 13, wherein the transmission stream manager instructs the stream transmitter to transmit the digest stream on receiving a request for the digest stream from the client machine, sends a message to determine a reception status of the digest stream to the client machine in every predetermined period, and receives a response message to the message from the client machine, and the receiver numbers recorder counts a number of receivers of a digest stream on receiving a request for transmission of the digest stream, a response message or a notification of no reception of a response message from the transmission stream manager, the stream transmitter generates and transmits the digest stream on receiving the instruction from the transmission stream manager, and erases the digest stream from a memory included inside thereof when a count of the receiver numbers recorder becomes zero, and the received stream manager sends a request for transmission of the digest stream to the transmission stream manager on receiving a request for the digest stream from a user, and sends a response message indicating a reception status of the digest stream on receiving a message to determine the reception status from the transmission stream manager.

15. The video delivery system in accordance with claim 13, wherein the transmission stream manager instructs the stream transmitter to transmit a skip stream or a reverse stream on receiving a request for a skip or a reverse of a digest from the client machine, the receiver numbers recorder counts a number of receivers of the digest stream on receiving a request for transmission or discard of a skip or a reverse from the client machine, the stream transmitter generates the skip stream or the reverse stream on receiving the instruction from the transmission stream manager to output the same to the client machine, and erases the skip stream or the reverse stream from a memory included inside thereof when a count of the receiver numbers recorder becomes zero, the stream receiver receives the digest stream, the skip stream or the reverse stream from the video server, the decoder decodes and outputs the received digest stream, skip stream or reverse stream, and the received stream manager sends a request for transmission of the skip stream or the reverse stream to the transmission stream manager on receiving a request for a skip or a reverse of the digest from a user, and sends a request for discard of the skip stream or the reverse stream to the transmission stream manager when receiving of the skip stream or the reverse stream is to be stopped.

16. The video delivery system in accordance with claim 15, wherein the transmission stream manager instructs the stream transmitter to transmit the skip stream or the reverse stream on receiving a request for a skip or a reverse of the digest from the client machine, and sends a message to determine a reception status of a skip stream or a reverse stream to the client machine in every predetermined period to receive a response message to the message from the client machine, and the received stream manager sends a request for transmission of the skip stream or the reverse stream to the transmission stream manager on receiving a request for a skip or a reverse of the digest from a user, and sends the response message indicating a reception status of the skip stream or the reverse stream on receiving the message to determine a reception status from the transmission stream manager.

17. The video delivery system in accordance with claim 11, wherein the transmission stream manager, on receiving a request for a skip or a reverse of a digest from the client machine, instructs the stream transmitter to transmit a skip stream or a reverse stream, the stream transmitter generates a skip stream that is a predetermined number of the digests ahead or a reverse stream that is a predetermined number of the digests behind, and transmits the same to the client machine on receiving the instruction from the transmission stream manager, the stream receiver receives the digest stream, the skip stream or the reverse stream from the video server, the decoder decodes and outputs the received digest stream, skip stream or reverse stream, and the received stream manager sends a request for a skip or a reverse of a digest to the transmission stream manager on receiving a request for a skip or a reverse of a digest from a user.

18. The video delivery system in accordance with claim 17, wherein the transmission stream manager receives a request for a digest stream, a skip stream or a reverse stream, or for a play back of a program stream corresponding to a digest included in a digest stream, a skip stream or a reverse stream from the client machine, instructs the stream transmitter to transmit a digest stream, a skip stream or a reverse stream on receiving a request for the digest stream, the skip stream or the reverse stream, and extracts the content ID of the digest included in the digest stream that identifies the program stream from a request for a play back of the program stream on receiving a request for a play back of the program stream to instruct the stream transmitter to transmit a program stream corresponding to the extracted content ID, the stream transmitter, on receiving the instruction to transmit a digest stream, a skip stream or a reverse stream from the transmission stream manager, generates and transmits a digest stream, a skip stream or a reverse stream that is a single stream into which said individual digests cut out from the respective plurality of programs stored in the contents storage and the corresponding content IDs are combined so as to relate to each other, and, on receiving the instruction to transmit the program stream from the transmission stream manager, transmits a program stream corresponding to the content ID to the client machine, the client machine further includes a digest information recorder for extracting the content IDs from the digest stream, the skip stream or the reverse stream that are being received by the stream receiver and recording the same one after another, and the received stream manager, on receiving a request for playing back of a program stream from a user, instructs the transmission stream manager to play back a program stream corresponding to the content ID acquired from the digest information recorder.

19. The video delivery system in accordance with claim 18, wherein the transmission stream manager holds a stream list for recording the content IDs one after another that identify the programs respectively original of digests included in a digest stream, a skip stream or a reverse stream being transmitted by the stream transmitter, searches the stream list on receiving a request for a skip or a reverse of a digest from the client machine, transmits the skip stream or the reverse stream if there exists the skip stream or the reverse stream that is transporting a digest forwardly or backwardly next to a digest that is being received by the client machine at a present, and instructs a transmission of a new skip stream or a new reverse stream if there does not exist the skip stream or the reverse stream, the stream transmitter, on a basis of the instruction from the transmission stream manager, transmits a skip stream that is a predetermined number of the digests ahead or a reverse stream that is a predetermined number of the digests behind to the client machine if there exists a skip stream or a reverse stream corresponding to the stream list, and generates and transmits a new skip stream or a new reverse stream if there does not exist a skip stream or a reverse stream corresponding to the stream list, and the received stream manager, on receiving a request for a skip or a reverse from a user, instructs the transmission stream manager to play back of a skip stream or a reverse stream corresponding to a content ID acquired from the digest information recorder.

20. The video delivery system in accordance with claim 11, wherein the client machine further comprises a storage for storing a received digest stream, and the decoder decodes and outputs a digest stream fed from the stream receiver and the storage.

* * * * *